United States Patent
Kubota et al.

(10) Patent No.: US 7,757,584 B2
(45) Date of Patent: Jul. 20, 2010

(54) CONNECTING ROD AND INTERNAL COMBUSTION ENGINE AND AUTOMOTIVE VEHICLE INCORPORATING THE SAME

(75) Inventors: Tsuyoshi Kubota, Shizuoka (JP); Hiroshi Yamagata, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 1098 days.

(21) Appl. No.: 11/419,055

(22) Filed: May 18, 2006

(65) Prior Publication Data

US 2006/0260433 A1 Nov. 23, 2006

(30) Foreign Application Priority Data

May 20, 2005 (JP) ............... 2005-148606
May 24, 2005 (JP) ............... 2005-150953

(51) Int. Cl.
 *F16C 7/02* (2006.01)
(52) U.S. Cl. ................................... 74/579 R
(58) Field of Classification Search ............ 74/579 E, 74/579 R, 593
See application file for complete search history.

(56) References Cited

U.S. PATENT DOCUMENTS

| | | | | |
|---|---|---|---|---|
| 4,860,419 A | * | 8/1989 | Hekman | 29/888.09 |
| 5,244,517 A | * | 9/1993 | Kimura et al. | 148/670 |
| 2002/0148325 A1 | | 10/2002 | Bergsma | |
| 2004/0025340 A1 | | 2/2004 | Kubota et al. | |
| 2004/0159178 A1 | | 8/2004 | Nakajima et al. | |
| 2004/0159179 A1 | | 8/2004 | Kubota et al. | |
| 2005/0126533 A1 | | 6/2005 | Iwasaki et al. | |

FOREIGN PATENT DOCUMENTS

| | | |
|---|---|---|
| EP | 0 919 315 A1 | 6/1999 |
| EP | 1 433 964 A2 | 6/2004 |
| JP | 02-096015 A | 4/1990 |
| JP | 04-078322 A | 3/1992 |
| JP | 06-099764 A | 4/1994 |
| JP | 07-100712 A | 4/1995 |
| JP | 09-182932 A | 7/1997 |
| JP | 10-299759 A | 11/1998 |
| JP | 2002-188618 A | 7/2002 |
| JP | 2003-193159 A | 7/2003 |

(Continued)

OTHER PUBLICATIONS

Matsubara, "Development of Free Machining Titanium Alloy for Connecting Rods," Titanium Zirconium, Oct. 1991, pp. 175-184, vol. 39—4th issue.

(Continued)

*Primary Examiner*—Vicky A Johnson
(74) *Attorney, Agent, or Firm*—Keating & Bennett, LLP

(57) ABSTRACT

A connecting rod made of a titanium alloy is a split-type connecting rod which includes a rod main body, and a big end located at an end of the rod main body, the big end being fracture-split into a rod portion which continues from the end of the rod main body and a cap portion which is coupled to the rod portion. The rod portion and the cap portion each have a fractured surface on which rugged features are present. A difference in height between a highest portion and a lowest portion on each fractured surface is about 230 μm or more.

10 Claims, 39 Drawing Sheets

FOREIGN PATENT DOCUMENTS

| | | |
|---|---|---|
| JP | 2004-003554 A | 1/2004 |
| JP | 2004-010963 A | 1/2004 |
| JP | 2004-211731 A | 7/2004 |
| JP | 2005-106271 A | 4/2005 |
| WO | 2004/007980 A1 | 1/2004 |

OTHER PUBLICATIONS

Official communication issued in counterpart European Application No. 06010300.9, mailed on Mar. 5, 2009.

* cited by examiner

Longitudinal Direction of Inclusions

Longitudinal Direction of Inclusions

FIG.15
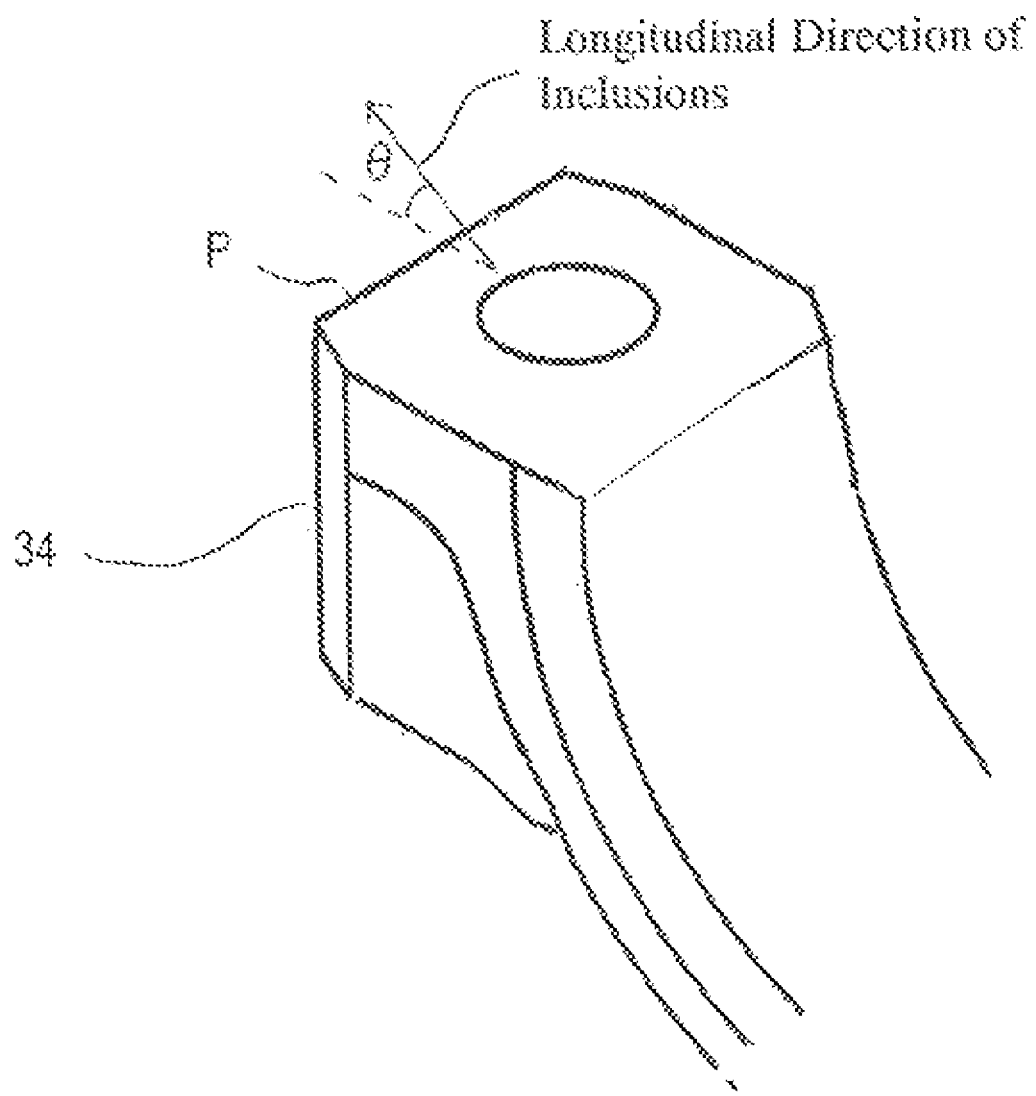
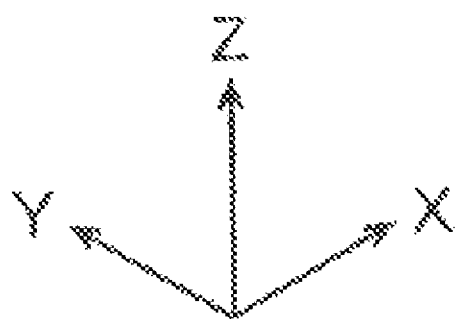

Longitudinal Direction of Inclusions

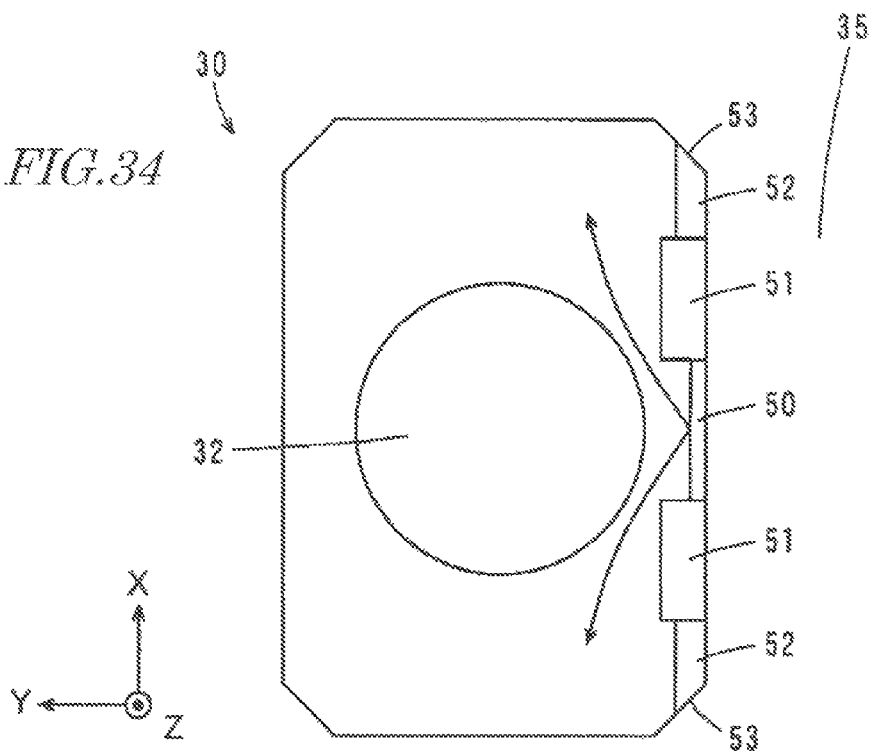
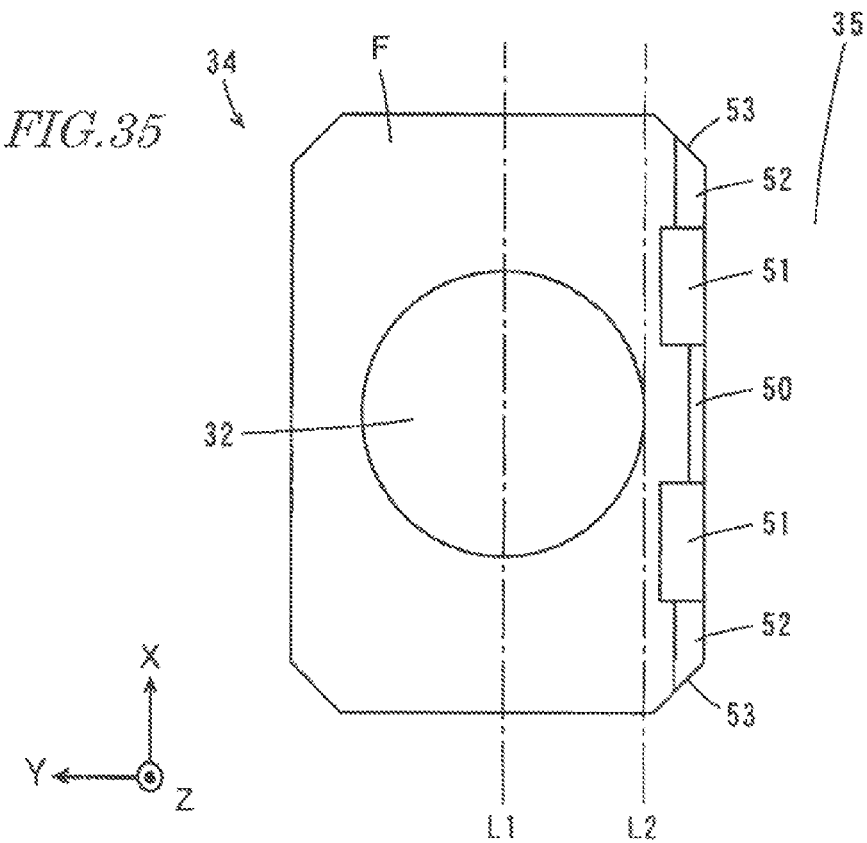

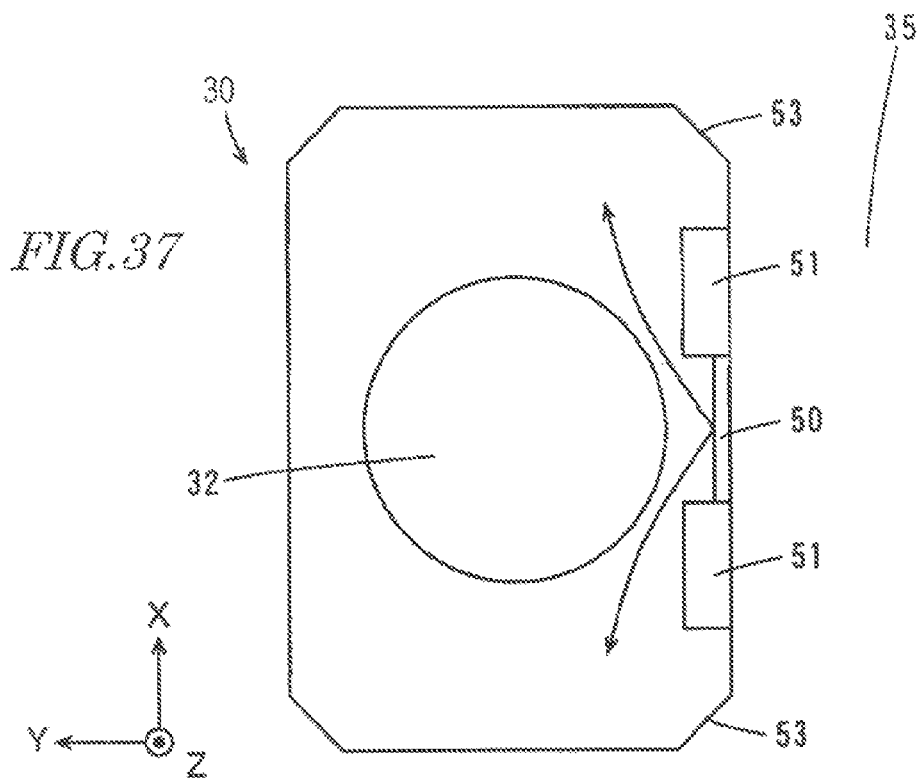
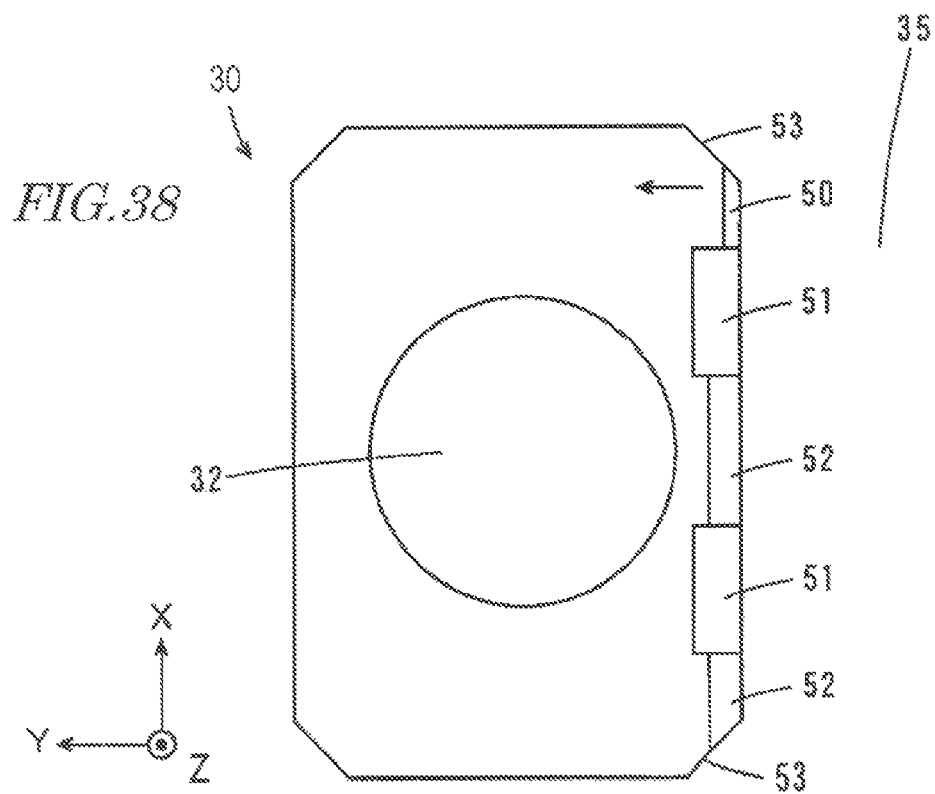

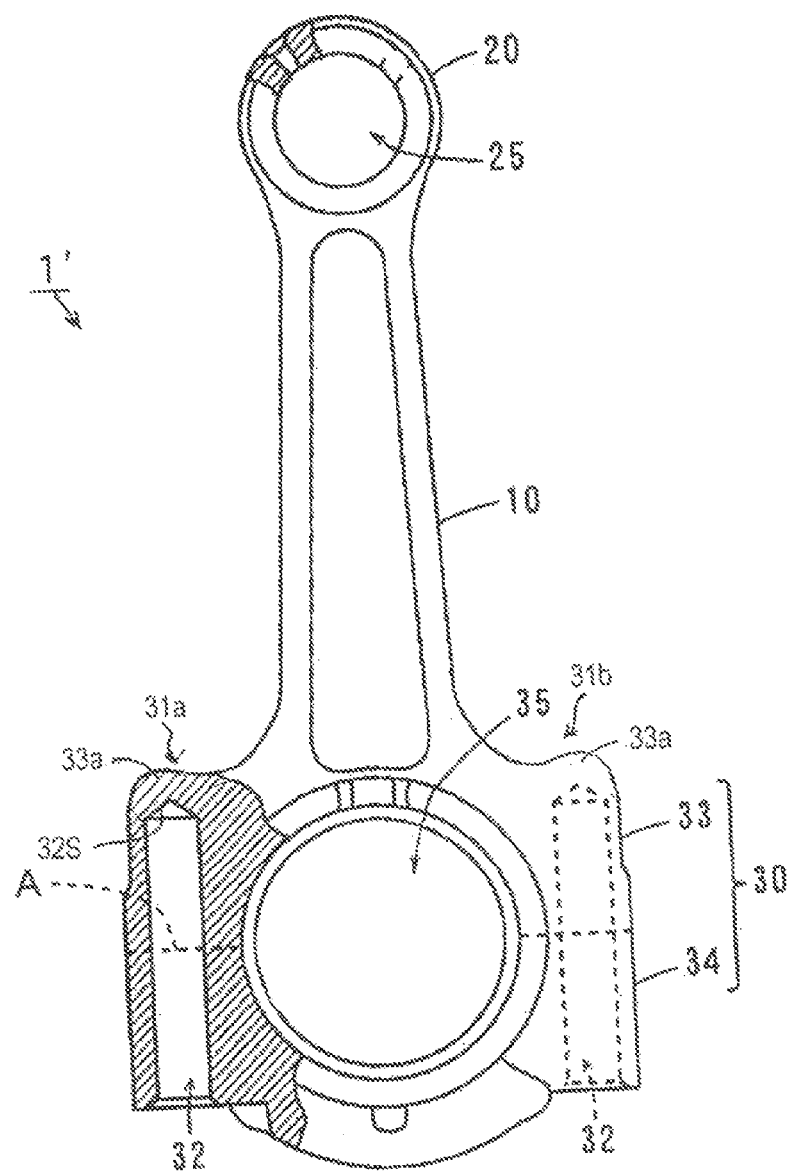
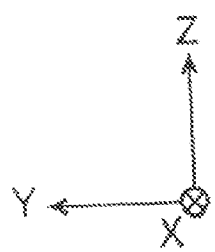
FIG.41

CONNECTING ROD AND INTERNAL COMBUSTION ENGINE AND AUTOMOTIVE VEHICLE INCORPORATING THE SAME

BACKGROUND OF THE INVENTION

1. Field of the Invention

The present invention relates to a connecting rod made of a titanium alloy, and more particularly, the present invention relates to a split-type connecting rod made of a titanium alloy having a split big end. Moreover, the present invention also relates to an internal combustion engine and an automotive vehicle incorporating such a connecting rod.

2. Description of the Related Art

In an internal combustion engine of an automotive vehicle, a part which is called a connecting rod (or con rod) is used for linking a crankshaft to a piston. FIG. 46 shows a conventional connecting rod 401. The connecting rod 401 includes a bar-like rod main body 410, a small end 420 which is provided at one end of the rod main body 410, and a big end 430 which is provided at the other end of the rod main body 410.

The small end 420, which has a throughhole (piston pin hole) 425 for allowing a piston pin to extend therethrough, is connected to a piston. On the other hand, the big end 430, which has a throughhole (crankpin hole) 435 for allowing a crankpin to extend therethrough, is connected to a crankshaft.

The big end 430 is split into a rod portion 433 which continues from one end of the rod main body 410, and a cap portion 434 which is coupled to the rod portion 433 with bolts 440. FIG. 47 shows a connecting rod 401 without the bolts 440 being engaged. In the big end 430, bolt holes 432 are formed so as to penetrate through both the rod portion 433 and the cap portion 434, thus allowing the bolts 440 to be screwed into the bolt holes 432.

The connecting rod 401 shown in FIG. 46 and FIG. 47 is called a split-type connecting rod because its big end 430 is split into the rod portion 433 and the cap portion 434 as described above.

Conventionally, steel has widely been used as the material used for forming connecting rods. In recent years, use of a titanium alloy has been proposed in order to reduce the weight of the connecting rod (see, for example, Toshihiko MATSUBARA, "Development of Free Machining Titanium Alloy for Connecting Rods", Titanium Zirconium, October 1991, Vol. 39, 4th issue, pp. 175-184). However, since a titanium alloy has different material characteristics from those of steel, the following problems may occur when producing a split-type connecting rod by using a titanium alloy.

The modulus of elasticity (i.e., the Young's modulus) of a titanium alloy is around 100 GPa to 110 GPa, which is about half of that of steel. Therefore, under the same amount of stress, a titanium alloy will be strained about twice as much as steel. Therefore, in the case where a titanium alloy is used as the material of a split-type connecting rod, if it is similar in shape to a steel connecting rod, the connecting rod will have a lower rigidity and thus, its big end will experience a significant deformation during use.

A deformed big end is schematically shown in FIG. 48. As can be seen from FIG. 48, inertial force which acts on the connecting rod deforms the rod portion of the big end so as to shrink inwards, whereby the roundness of the crankpin hole is reduced. This causes problems in that the friction loss may increase, and in that a bearing metal which is placed inside the crankpin hole of the big end may stick to the crankpin.

In order to prevent such problems, a conventional connecting rod made of a titanium alloy is designed so that its big end is thicker than that of a steel connecting rod in an attempt to ensure rigidity and suppress deformation of the big end. FIG. 49 schematically shows a connecting rod made of a titanium alloy 501 which is disclosed in MATSUBARA, supra. As can be seen from FIG. 49, shoulders 531a and 531b (i.e., portions extending from the rod main body 510 toward both lateral sides) of the rod portion 533 are significantly thick.

However, increased thickness will result in an increased weight of the connecting rod, thus detracting from the effect of weight reduction that is realized by using a titanium alloy, which has a small specific gravity.

SUMMARY OF THE INVENTION

In order to overcome the problems described above, preferred embodiments of the present invention provide a split-type connecting rod made of a titanium alloy that has sufficient rigidity while preventing unwanted increases in its weight.

A connecting rod according to a first preferred embodiment of the present invention is a split-type connecting rod made of a titanium alloy, including a rod main body, and a big end located at an end of the rod main body, the big end having a throughhole, wherein, the big end is fracture-split into a rod portion which continues from the end of the rod main body and a cap portion which is coupled to the rod portion, the rod portion and the cap portion each have a fractured surface on which rugged features are present, and a difference in height between a highest portion and a lowest portion on each fractured surface is approximately 230 µm or more. Thus, the advantages of reduced weight and sufficient rigidity are achieved.

In a preferred embodiment of the present invention, each of the rod portion and the cap portion preferably includes inclusions in an area near the fractured surface thereof.

In a preferred embodiment of the present invention, the titanium alloy preferably includes a rare-earth element and sulfur, and the inclusions are a compound of the rare-earth element and sulfur.

In a preferred embodiment of the present invention, the titanium alloy contains no less than about 0.05 wt % and no more than about 0.7 wt % of the rare-earth element and no less than about 0.05 wt % and no more than about 0.2 wt % of sulfur.

In a preferred embodiment of the present invention, a longitudinal direction of the inclusions is at arranged an angle of no less than 0° and no more than about 30° with respect to an abutting surface located between the rod portion and the cap portion.

In a preferred embodiment of the present invention, the longitudinal direction of the inclusions is substantially parallel to the abutting surface.

In a preferred embodiment of the present invention, metal flow lines in an area near the abutting surface are substantially parallel to the longitudinal direction of the inclusions.

In a preferred embodiment of the present invention, a longitudinal direction of the inclusions is substantially perpendicular to an abutting surface between the rod portion and the cap portion.

In a preferred embodiment of the present invention, the big end has a bolt hole in which a bolt for coupling together the rod portion and the cap portion is to be screwed, and the bolt hole is a bottomed hole which extends from the cap portion toward the rod portion and has a bottom surface within the rod portion.

A connecting rod according to another preferred embodiment of the present invention is a split-type connecting rod made of a titanium alloy including a rod main body, a small end located at an end of the rod main body, the small end having a throughhole, and a big end located at another end of the rod main body, the big end having a throughhole with a larger diameter than that of the throughhole of the small end, wherein, the big end is split into a rod portion which continues from the another end of the rod main body and a cap portion which is coupled to the rod portion with a bolt, the big end has a bolt hole in which a bolt is to be screwed, and the bolt hole is a bottomed hole which extends from the cap portion toward the rod portion and has a bottom surface within the rod portion. Thus, the advantages of reduced weight and sufficient rigidity are achieved.

In a preferred embodiment of the present invention, a shortest distance from the bottom surface of the bolt hole to an outer surface of the rod portion is about 3 mm or more.

In a preferred embodiment of the present invention, the rod portion of the big end includes a protrusion which protrudes toward the small end.

An internal combustion engine according to another preferred embodiment of the present invention includes a connecting rod having a structure according to one of the preferred embodiments of the present invention described above. Thus, the internal combustion engine is also able to achieve and provide the advantages described above.

An automotive vehicle according to a further preferred embodiment of the present invention includes an internal combustion engine having the above-described construction. Thus, the automotive vehicle achieves the advantages described above.

A connecting rod made of a titanium alloy according to a preferred embodiment of the present invention is a split-type connecting rod whose big end is fracture-split into a rod portion which continues from one end of a rod main body and a cap portion which is coupled to the rod portion. The rod portion and the cap portion each have a fractured surface on which rugged features are present, and a difference in height between a highest portion and a lowest portion on each fractured surface is preferably about 230 µm or more. As a result, the fractured surfaces can be firmly fitted onto each other, whereby the rigidity of the big end is sufficiently high. Thus, deformation of the big end can be prevented without having to make the rod portion thick and heavier as is required in the prior art.

In a big end of a connecting rod made of a titanium alloy according to another preferred embodiment of the present invention, a bottomed hole defines a bolt hole, which extends from the cap portion toward the rod portion and has a bottom surface within the rod portion. Since the bottom of the bolt hole reinforces the rod portion, the rigidity of the rod portion is more enhanced than in the case where a throughhole is formed as a bolt hole. Thus, sufficient rigidity can be ensured and deformation of the big end can be prevented, without having to make the rod portion thick and heavier as is required in the prior art.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 15 is a diagram for explaining the relationship between the longitudinal direction of inclusions and an abutting surface.

FIGS. 24B, 24C and 24D are enlarged photographs of encircled portions 24B, 24C and 24D in FIG. 24A. FIG. 24E is an enlarged photograph of an encircled portion 24E in FIG. 24B.

FIG. 34 is a diagram for explaining progress of a fracture on an intended fracture surface of a big end having notches.

FIG. 35 is a diagram showing a state of a fractured surface of a big end having notches.

FIG. 37 is a schematic diagram showing a progress of a fracture on an intended fracture surface of a big end having another structure which is preferable for the prevention of double fracturing.

FIG. 38 is a schematic diagram showing a progress of a fracture on an intended fracture surface of a big end having another structure which is preferable for the prevention of double fracturing.

FIG. 41 is a front view which schematically shows a connecting rod according to a preferred embodiment of the present invention before undergoing a fracture split.

DETAILED DESCRIPTION OF PREFERRED EMBODIMENTS

Hereinafter, preferred embodiments of the present invention will be described with reference to the figures. Note that the present invention is not to be limited to the preferred embodiments described below.

First Preferred Embodiment

As will be specifically described below, a connecting rod according to the present preferred embodiment is a split-type connecting rod which is formed by a fracture technique (and hence may also be called a "fracture split-type"). A fracture technique is a technique by which, after a big end is integrally formed, the big end is split into a rod portion and a cap portion via brittle fracture. Conventionally, the fracture technique has not been used for a connecting rod made of a titanium alloy because, since a titanium alloy has a high toughness, it has been considered extremely difficult to apply a fracture technique (which requires brittle fracture) to a connecting rod made of a titanium alloy. For example, the connecting rod made of a titanium alloy which is disclosed in MATSUBARA, supra, is not formed using a fracture technique. Conventionally, when forming a split-type connecting rod made of a titanium alloy, a rod portion and a cap portion would be formed as separate pieces, or, a big end would be integrally formed and then cut via machining.

Figure 1:
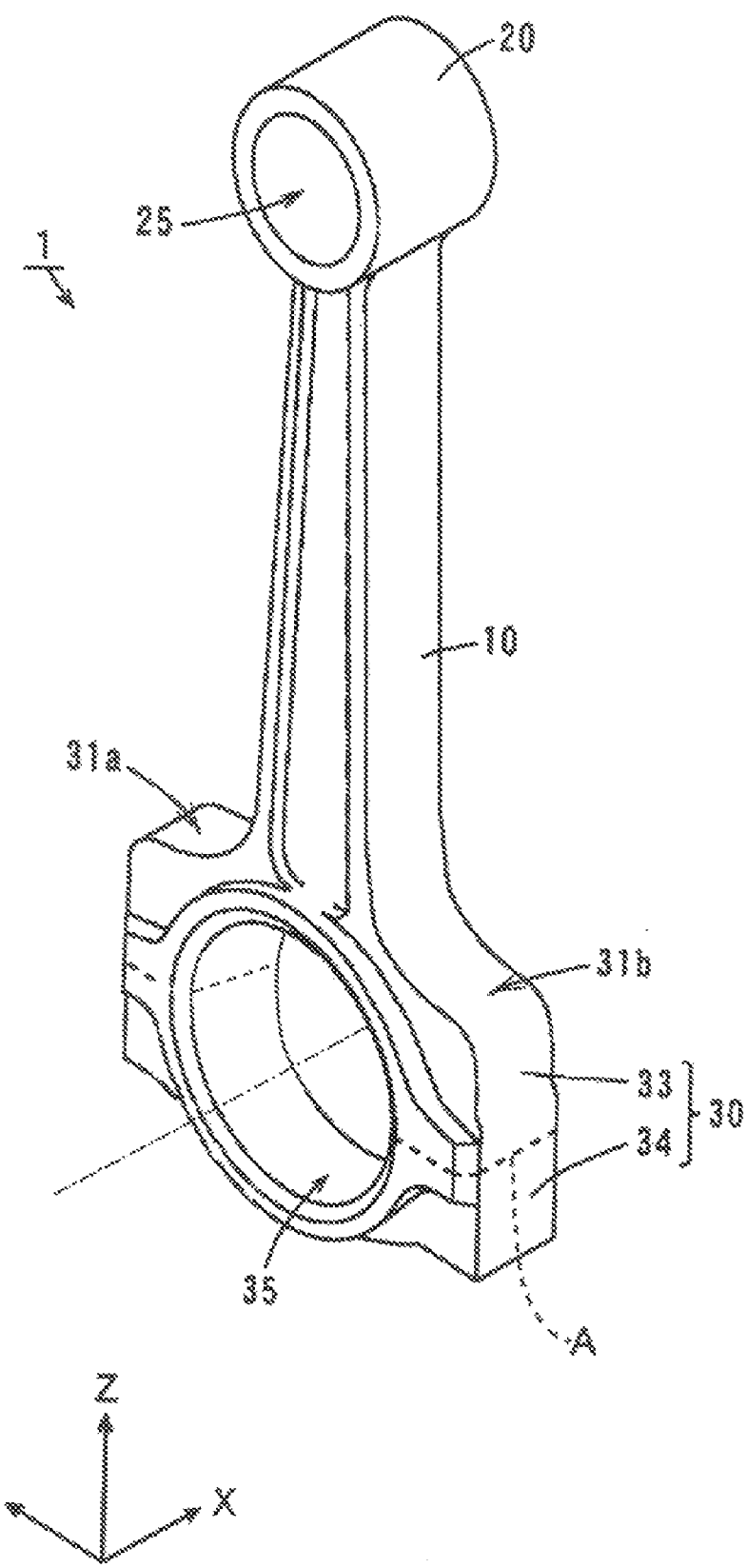
FIG. 1 is a perspective view which schematically shows a connecting rod according to a preferred embodiment of the present invention before undergoing a fracture split.
Figure 2:
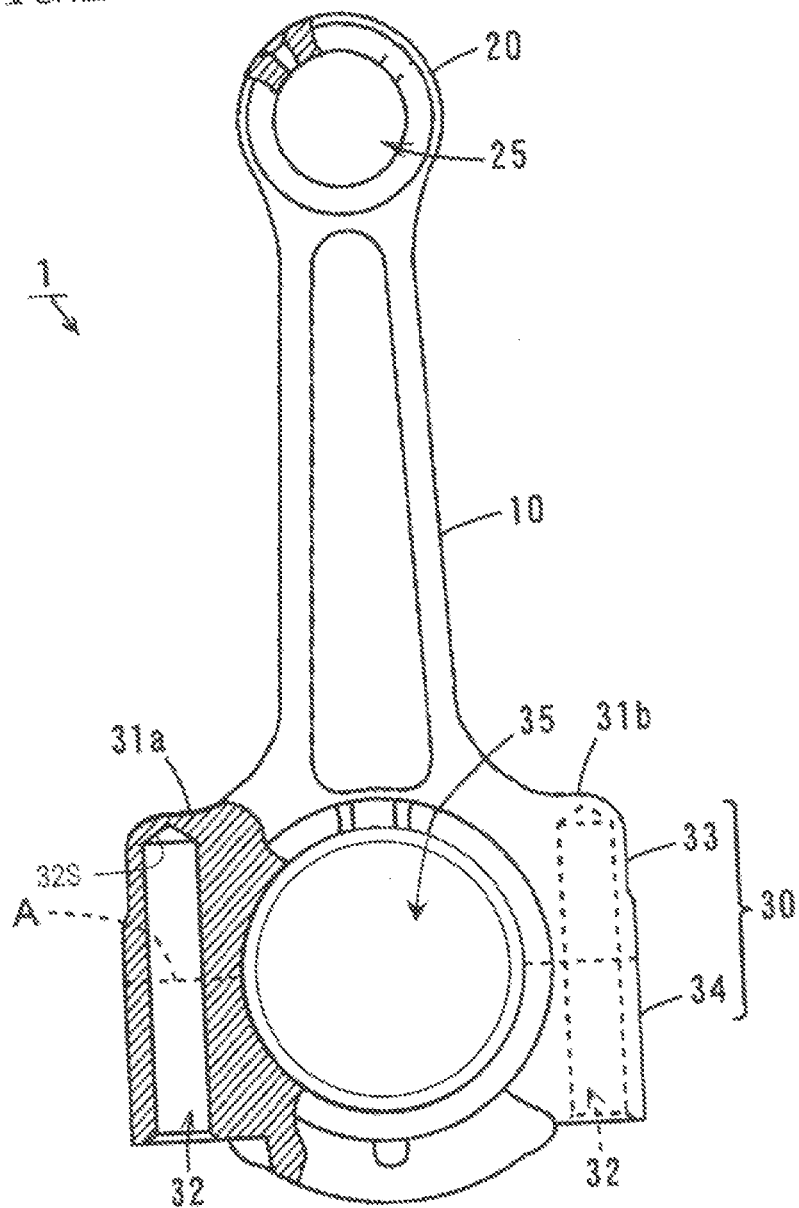
FIG. 2 is a front view which schematically shows a connecting rod according to a preferred embodiment of the present invention before undergoing a fracture split.

FIGS. 1 and 2 show a connecting rod 1 made of a titanium alloy according to the present preferred embodiment. FIGS. 1 and 2 are a perspective view and a plan view, respectively, which schematically show the connecting rod 1 before undergoing a fracture split.

As shown in FIGS. 1 and 2, the connecting rod 1 preferably includes a bar-like rod main body 10, a small end 20 which is provided at one end of the rod main body 10, and a big end 30 which is provided at the other end of the rod main body 10.

The small end 20 has a throughhole (called a "piston pin hole") 25 for allowing a piston pin to extend therethrough. On the other hand, the big end 30 has a throughhole (called a "crankpin hole") 35 for allowing a crankpin to extend therethrough. The crankpin hole 35 typically has a larger diameter than that of the piston pin hole 25.

The big end 30 has shoulders 31a and 31b extending from the rod main body 10 toward both lateral sides. Moreover, bolt holes 32 are formed in the big end 30 as shown in FIG. 2. The bolt holes 32 in the present preferred embodiment extend from the cap portion 34 toward the rod portion 33, and are each a bottomed hole having a bottom surface 32s inside the rod portion 33.

In the following descriptions, the direction in which the rod main body 10 extends will be referred to as the "longitudinal direction", and the direction of a center axis (shown by a dot-dash line in FIG. 1) of the crankpin hole 35 will be referred to as the "axial direction". Moreover, a direction which is substantially perpendicular to the longitudinal direction and the axial direction will be referred to as the "width direction". In the figures, the longitudinal direction is shown by arrow Z, the axial direction is shown by arrow X, and the width direction is shown by arrow Y.

In the big end 30 before undergoing a fracture split, as shown in FIGS. 1 and 2, the rod portion 33 and the cap portion 34 are integrally formed. The big end 30 is to be fracture-split along an intended fracture surface A, which is substantially parallel to the axial direction X and the width direction Y (i.e., substantially perpendicular to the longitudinal direction Z). The intended fracture surface A is prescribed so as to extend through the center axis of the crankpin hole 35, for example.

Figure 3:
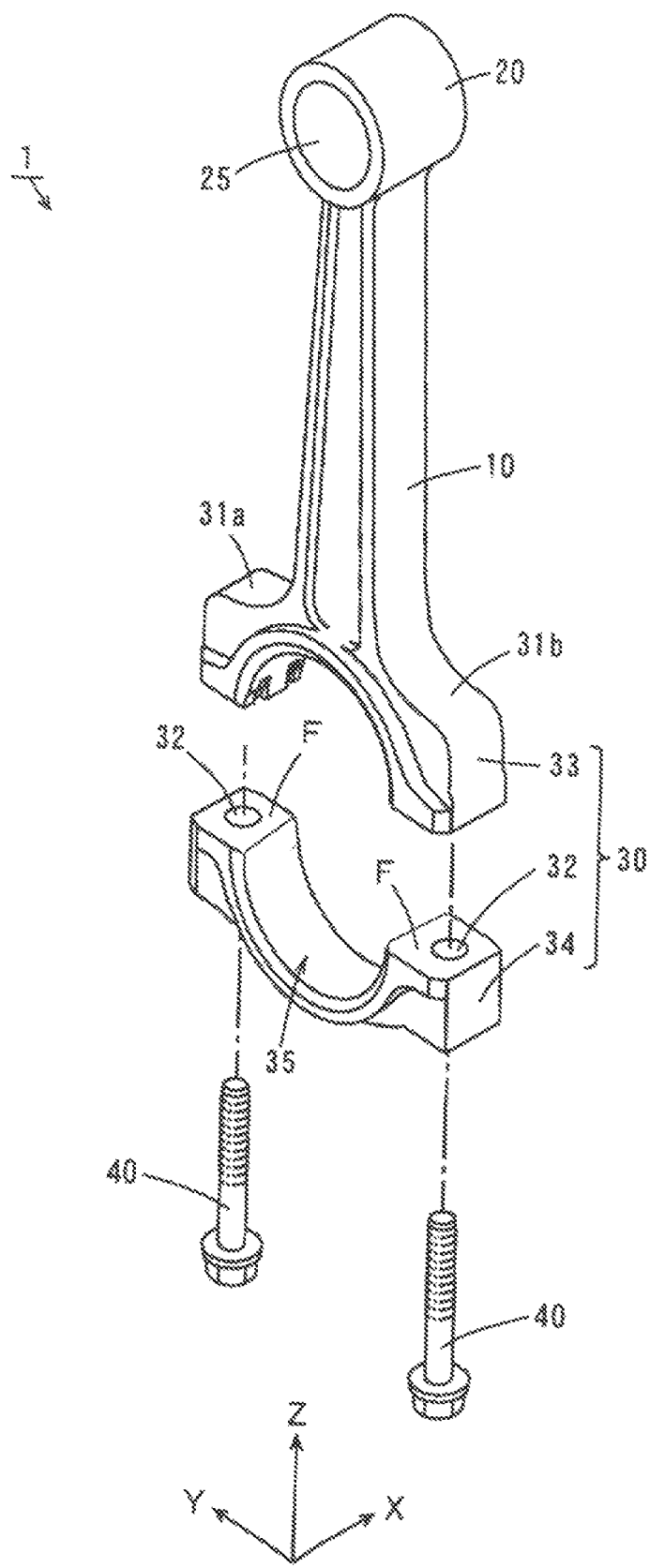
FIG. 3 is a perspective view which schematically shows a connecting rod according to a preferred embodiment of the present invention after undergoing a fracture split.

FIG. 3 shows the connecting rod 1 after undergoing a fracture split. The big end 30 of the connecting rod 1 has been split into the rod portion 33, which continues to the other end of the rod main body 10, and the cap portion 34, which is coupled to the rod portion 33 via connecting members (which herein are exemplified as bolts 40 but may be any other suitable connecting member).

Through a fracture split, the rod portion 33 and the cap portion 34 each acquire a fractured surface F, on which minute rugged features are present. By allowing the fractured surface F of the rod portion 33 and the fractured surface F of the cap portion 34 to abut with each other, and screwing the bolts 40 into the bolt holes 32, the rod portion 33 and the cap portion 34 are coupled to each other.

Figure 48:
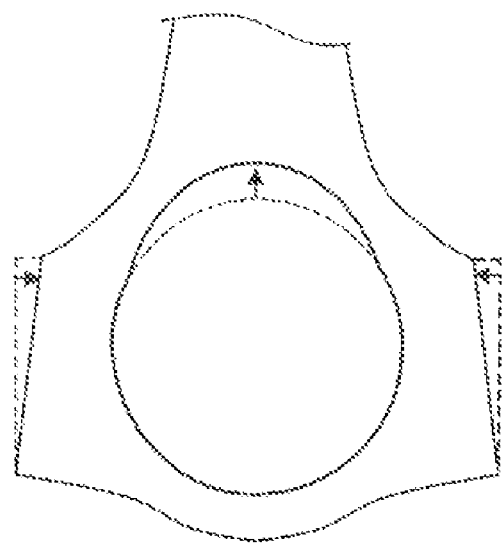
FIG. 48 is a diagram schematically showing a big end being deformed during engine operation.

As described above, the connecting rod 1 according to the present preferred embodiment is a fracture split-type connecting rod. In the fracture split-type connecting rod 1, complementary rugged features are present on the fractured surfaces F of the rod portion 33 and the cap portion 34, thus enabling accurate positioning of the rod portion 33 and the cap portion 34. As the ruggednesses on the fractured surface F fit one another, the rod portion 33 and the cap portion 34 are firmly coupled to each other, whereby the rigidity of the entire big end 30 is improved. In particular, since any force acting to shrink the rod portion 33 inwards will be received not only by the rod portion 33 but also by the cap portion 34, deformation as shown in FIG. 48 can be minimized and prevented.

Figure 49:
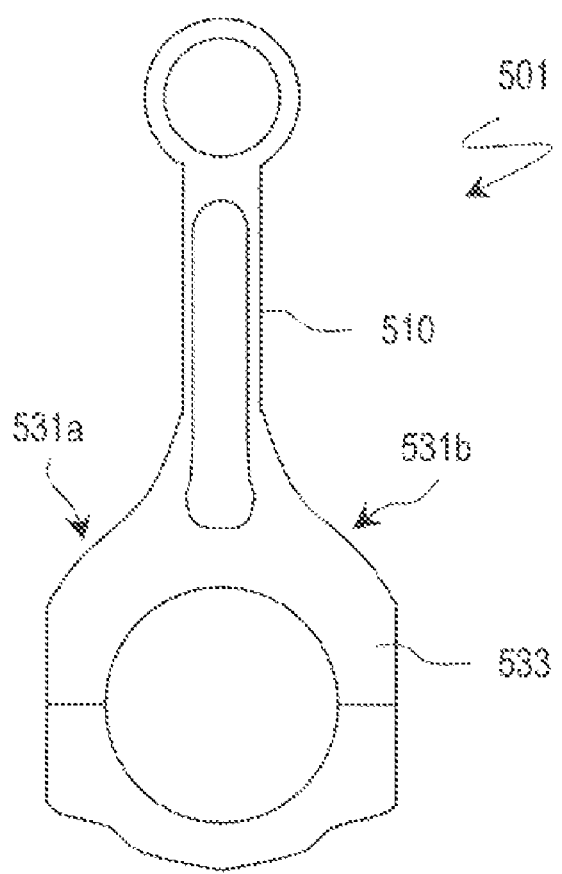
FIG. 49 is a front view schematically showing a conventional split-type connecting rod.

The inventors have conducted a study by actually producing connecting rods of various specifications, each made of a titanium alloy. As a result, it has been discovered that, by prescribing the difference in height between a highest portion and a lowest portion of each fractured surface F to be about 230 μm or more (and more preferably about 300 μm or more), the fractured surfaces F can be more firmly fitted onto each other, whereby the rigidity of the big end 30 becomes sufficiently high. Thus, by prescribing the level differences in each fractured surface F to be about 230 μm or more, it becomes possible to effectively prevent the deformation of the big end 30, without having to make the rod portion 33 thick as shown in FIG. 49.

Figure 4:
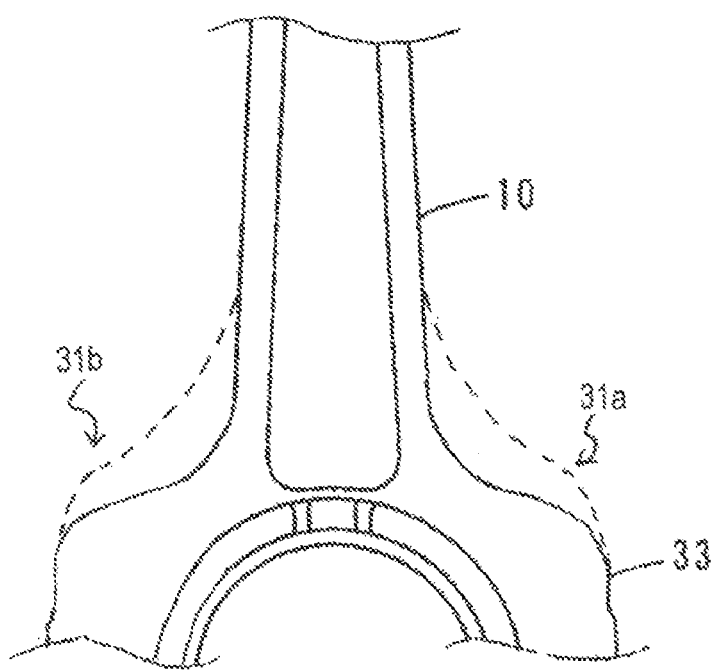
FIG. 4 is a diagram showing an area of the shoulders of a connecting rod according to a preferred embodiment of the present invention.

In the connecting rod 1 according to the present preferred embodiment, the rod portion 33 has an increased rigidity because of the level differences in each fractured surface F being set to about 230 μm or more, as described above. Therefore, it is possible to ensure sufficient rigidity without making the shoulders 31a and 31b thick. The area of the shoulders 31a and 31b of the connecting rod 1 is shown enlarged in FIG. 4. For comparison, FIG. 4 also shows the shape of the connecting rod 501 shown in FIG. 49 (broken line), whose rod portion 533 is made thicker. As can be seen from FIG. 4, in the connecting rod 1 according to the present preferred embodiment, the thickness of the shoulders 31a and 31b is smaller than in the connecting rod 501 shown in FIG. 49, thus making for a reduced weight.

Figure 5:
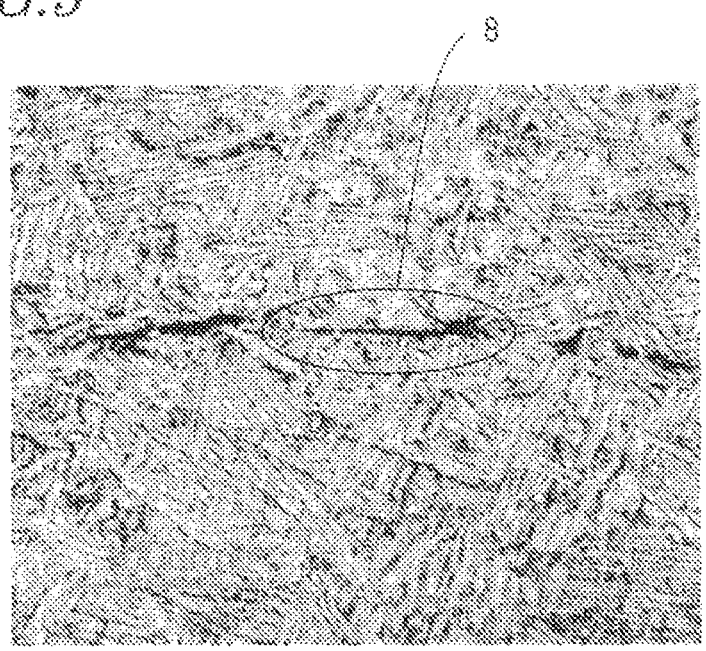
FIG. 5 is a micrograph of inclusions contained in a connecting rod according to a preferred embodiment of the present invention.

In order to increase the level differences in each fractured surface F so as to be about 230 μm or more as described above, it is preferable that the rod portion 33 and the cap portion 34 contain "inclusions" in the area of their fractured surfaces F. FIG. 5 is a micrograph showing a cross section of a connecting rod which has actually been produced (described later). As shown in FIG. 5, inclusions 8 exist within a titanium alloy matrix. Each inclusion 8 has an anisotropic shape, e.g., needle-like (fibrous) as shown in FIG. 5, or elliptical. Each inclusion 8 typically has a length of about 10 μm to about 400 μm. Note that the inclusions 8 exemplified in FIG. 5 are preferably a compound of a rare-earth element and sulfur.

If the rod portion 33 and the cap portion 34 contain inclusions 8 in the area around their fractured surfaces F (i.e., the area around the intended fracture surface A before undergoing a fracture split), the inclusions 8 will promote brittle fracture so that relatively large ruggednesses are likely to be formed on the fractured surfaces F. This makes it easy to sufficiently increase the level differences in each fractured surface F, up to about 230 μm or more.

Figure 6:
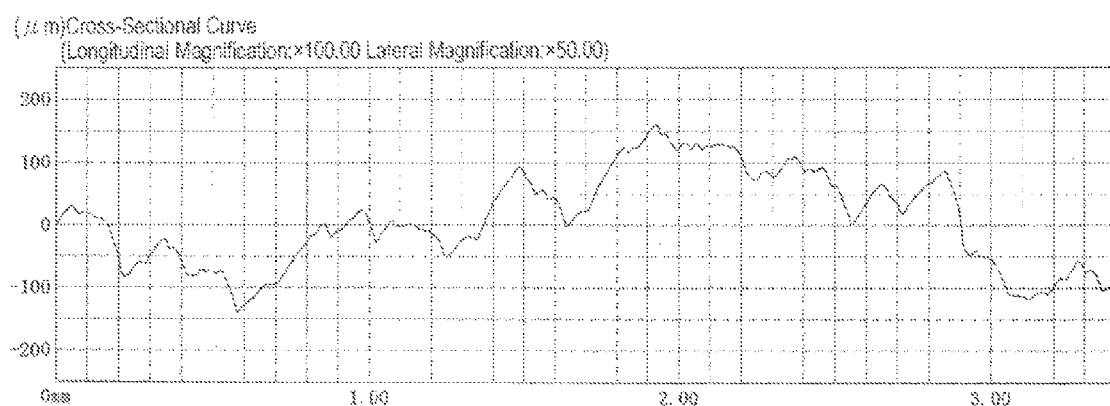
FIG. 6 is a graph showing a cross-sectional curve of a fractured surface, with respect to a connecting rod that contains inclusions (Example).
Figure 7:
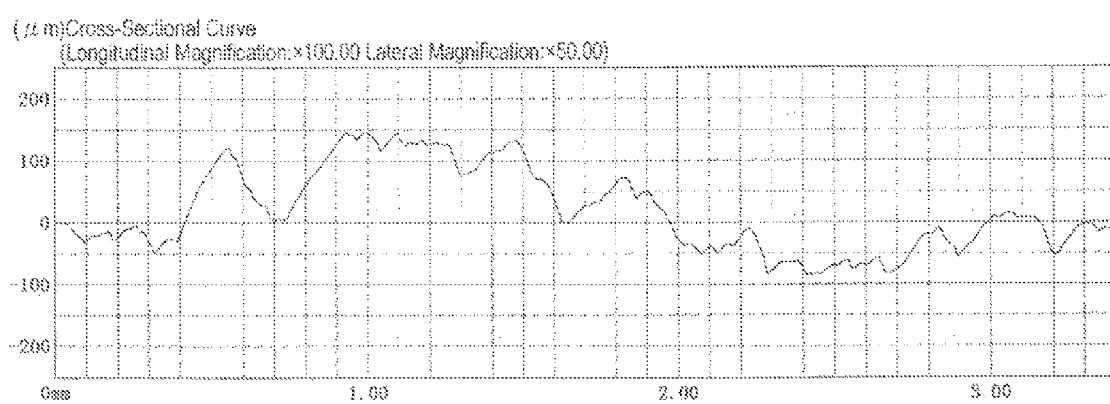
FIG. 7 is a graph showing a cross-sectional curve of a fractured surface, with respect to a connecting rod that contains inclusions (Example).
Figure 8:
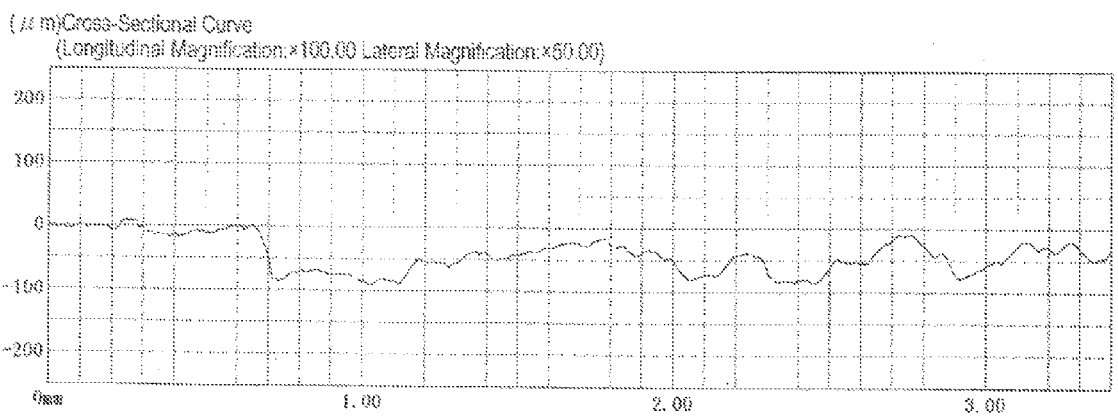
FIG. 8 is a graph showing a cross-sectional curve of a fractured surface, with respect to a connecting rod that contains no inclusions (Comparative Example).

FIGS. 6 and 7 each show a cross-sectional curve (surface roughness) of a fractured surface, with respect to a connecting rod that contains inclusions 8 (Examples). FIG. 8 shows a cross-sectional curve (surface roughness) of a fractured surface, with respect to a connecting rod that contains no inclusions 8 (Comparative Example). Note that the surface roughnesses shown in FIGS. 6, 7 and 8 are obtained by plotting roughness along the width direction Y.

From comparisons between FIGS. 6, 7 and 8, it can be seen that the level differences in each fractured surface increase when inclusions 8 are contained. Specifically, level differences in each fractured surface (i.e., a maximum height Ry as calculated according to JIS B0601-1994) is about 299 μm in the Example shown in FIG. 6, and about 232 μm in the Example shown in FIG. 7, whereas it is about 100 μm in the Comparative Example shown in FIG. 8.

Furthermore, connecting rods of the Examples and Comparative Example described above were actually incorporated into engines, and subjected to engine tests. In the connecting rod of the Comparative Example whose cross-sectional curve is shown in FIG. 8, the big end is significantly deformed, and sticking of the bearing metal to the crankpin occurred occasionally. On the other hand, no such sticking occurred in the connecting rods of the Examples whose cross-sectional curves are shown in FIGS. 6 and 7. From these results, it can be seen that the deformation of the big end 30 can be prevented by prescribing the level differences in each fractured surface to be about 230 μm or more.

Figure 9:
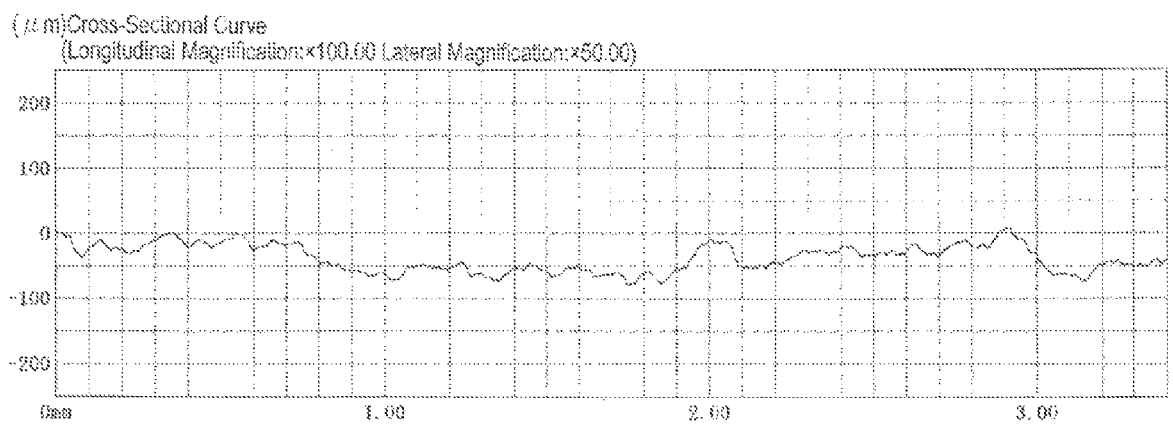
FIG. 9 is a graph showing a cross-sectional curve of a fractured surface, with respect to a fracture split-type connecting rod which is made of steel.

For reference's sake, a cross-sectional curve of a fractured surface of a fracture split-type connecting rod which is made of steel is shown in FIG. 9. In the example shown in FIG. 9, the level differences in each fractured surface are about 88 μm. As can also be seen from this, by allowing inclusions 8 to be contained in the connecting rod 1 made of a titanium alloy, it becomes possible to impart level differences which are significantly greater (specifically, twice or more) than conventional level differences to the fractured surfaces F.

According to a study by the inventors, it has also been discovered that orienting the longitudinal direction of the inclusions 8 in a predetermined direction makes it possible to facilitate, and increase the certainty of, a fracture split of the connecting rod 1 made of a titanium alloy.

Figure 10:
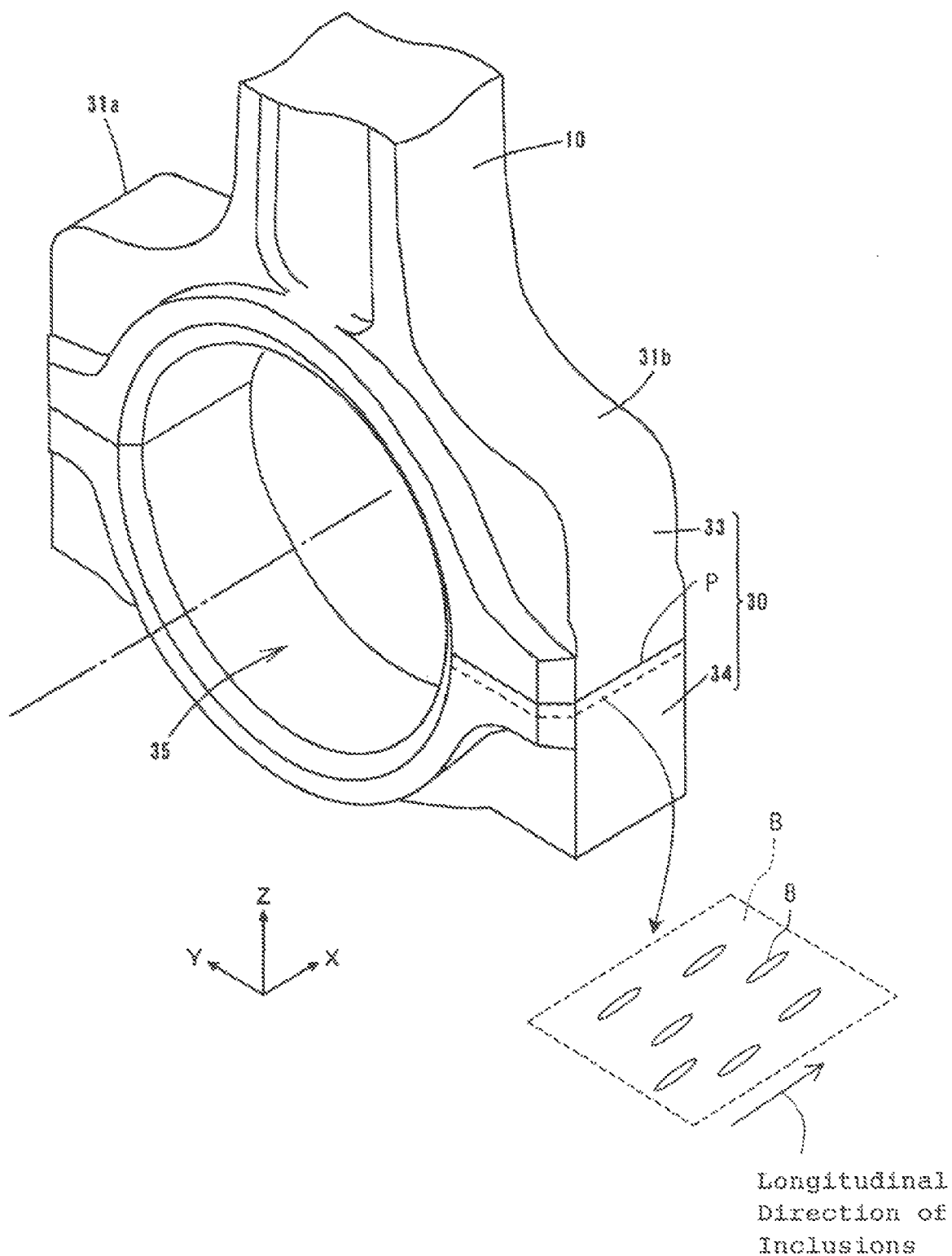
FIG. 10 is a diagram schematically showing how inclusions may be present in an area of an abutting surface between a rod portion and a cap portion.

FIG. 10 shows an example of the longitudinal direction of the inclusions 8 where a good fracturing ability is obtained. FIG. 10 is a diagram schematically showing how inclusions 8 may be present near the abutting surface P between the rod portion 33 and the cap portion 34. In this diagram, the inclusions 8 on a cross section B near the abutting surface P are shown enlarged in a lower right portion of the figure.

In the present specification, an "abutting surface" between the rod portion 33 and the cap portion 34 refers to a virtual plane P that coincides with the intended fracture surface A of the connecting rod 1 before undergoing a fracture split, rather than the actual fractured surfaces F which are to be formed on the respective surfaces of the rod portion 33 and the cap portion 34 and which will include minute ruggednesses. In the present preferred embodiment, a fracture split occurs along an intended fracture surface A which is substantially perpendicular to the longitudinal direction Z (i.e., substantially parallel to the axial direction X and the width direction Y) as shown in FIG. 1. As a result, the abutting surface P is a plane which is substantially perpendicular to the longitudinal direction Z and is substantially parallel to the axial direction X and the width direction Y. Note that the intended fracture surface A or the abutting surface P is not limited to that which is exemplified herein. The intended fracture surface A or the abutting surface P does not need to be substantially perpendicular to the longitudinal direction Z, or does not need to be substantially parallel to the axial direction X and the width direction Y.

In the example shown in FIG. 10, the inclusions 8 extend substantially parallel to the abutting surface P. In other words, the inclusions 8 are aligned in such a manner that their longitudinal direction lies substantially parallel to the abutting surface P. Although inclusions 8 within a cross section of the cap portion 34 are illustrated herein, it will be understood that the longitudinal direction of the inclusions 8 is substantially parallel to the abutting surface P also within a cross section of the rod portion 33.

Figure 11:
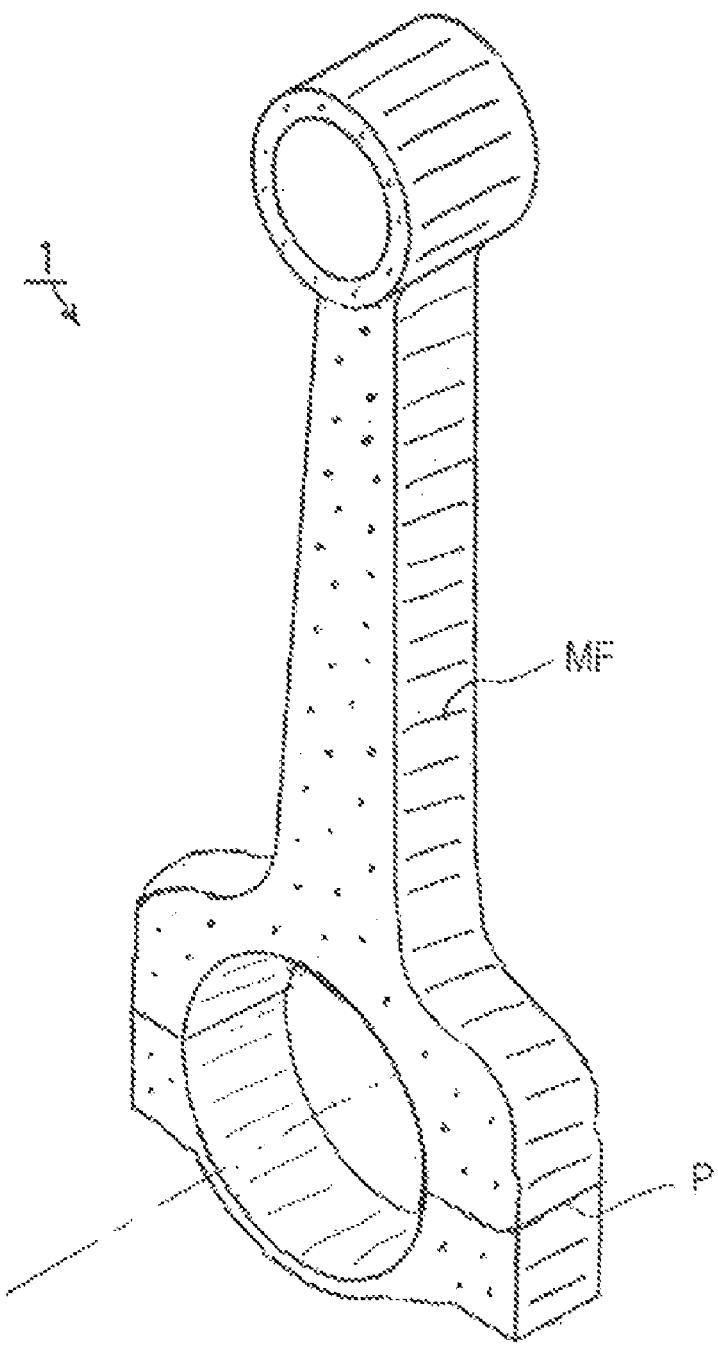
FIG. 11 is a diagram schematically showing metal flow lines of a connecting rod according to a preferred embodiment of the present invention.

FIG. 11 shows metal flow lines (also called "fiber flow lines") of a connecting rod 1 that contains inclusions 8 in a manner as shown in FIG. 10. The metal flow lines, which are also called "flow lines", represent flows of metallographical structures that are observed in any forged product. When a cut surface of a forged product is corroded, metal flow lines will be observed as fibrous metallographical structures.

As schematically shown by solid lines MF in FIG. 11, the metal flow lines near the abutting surface P lie substantially parallel to the abutting surface P. Therefore, the metal flow lines near the abutting surface P are substantially parallel to the longitudinal direction of the inclusions 8. Thus, the inclusions 8 are typically aligned in such a manner that their longitudinal direction follows along the metal flow lines. This is considered to occur as a result of the inclusions 8 expanding so as to follow the flow of metallographical structures when the metal flow lines are formed. Therefore, as will be described later, by prescribing the metal flow lines to be substantially parallel to the abutting surface P, it can be ensured that the longitudinal direction of the inclusions 8 is substantially parallel to the abutting surface P.

Figure 12:
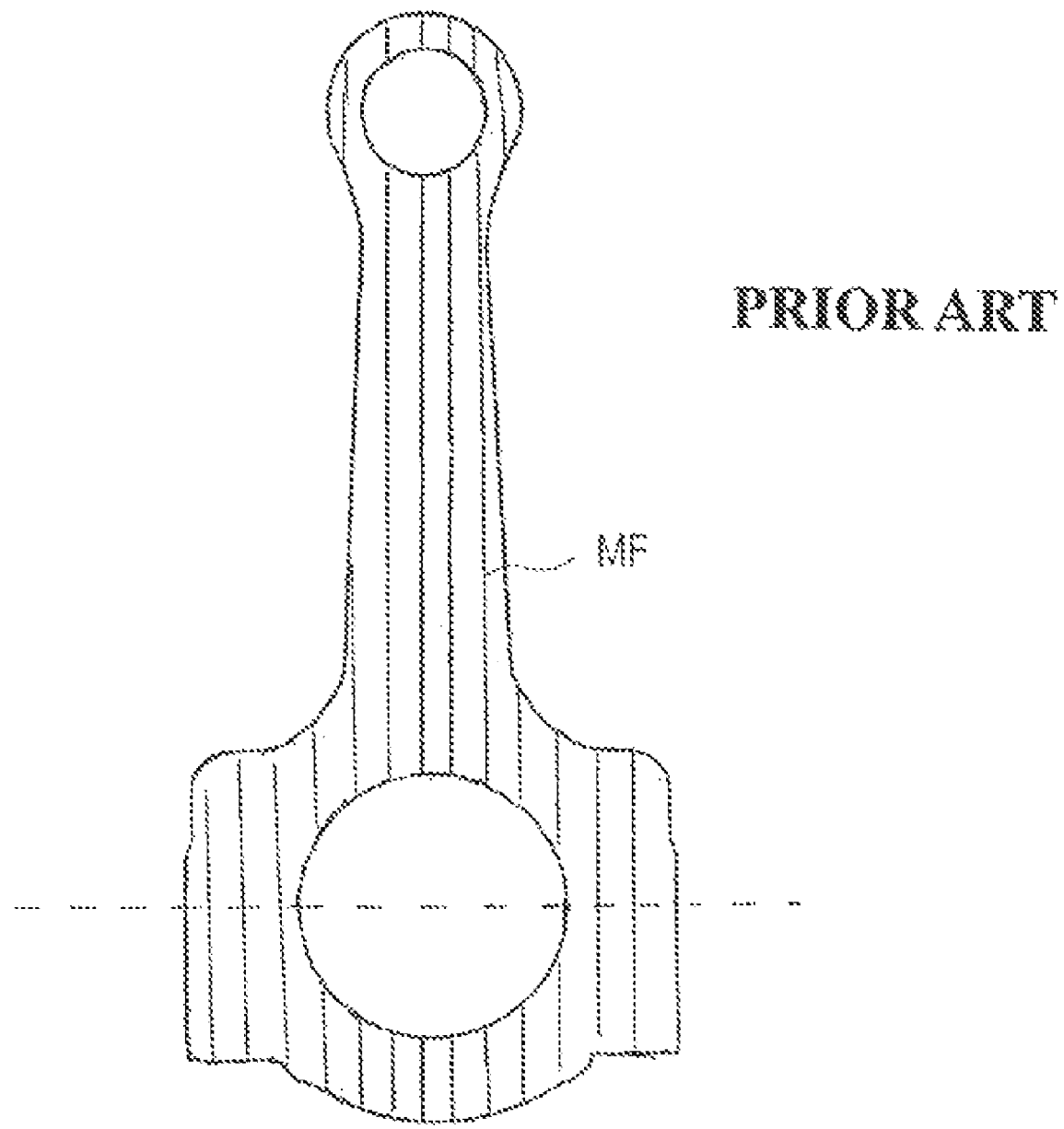
FIG. 12 is a diagram schematically showing metal flow lines of a conventional connecting rod.

From the standpoints of facilitating die designing, and providing an improved mechanical strength and an improved production yield, it might be conceivable to design the connecting rod so that its metal flow lines will be substantially parallel to the longitudinal direction of the connecting rod, as shown in FIG. 12. However, when the big end of a connecting rod which is designed in this manner is to be fracture-split, it will be necessary to effect a brittle fracture across the metal flow lines, i.e., so as to cut through the fibrous metallographical structures.

On the other hand, in a structure as shown in FIG. 11, where the metal flow lines lie substantially parallel to the abutting surface P (i.e., the intended fracture surface A before undergoing a fracture split), a fracture split can be effected without traversing the metal flow lines, so that the connecting rod made of a titanium alloy, having a high toughness, can be easily fracture-split.

Furthermore, in a structure as shown in FIG. 10, where inclusions 8 whose longitudinal direction is substantially parallel to the abutting surface P are contained in the area around the abutting surface P between the rod portion 33 and the cap portion 34, a fracture split can be performed more easily and with more certainty. This is considered to be because the inclusions 8 having an anisotropic shape serve as beginning points of fracture, thus promoting the brittle fracture along a plane which is substantially parallel to the longitudinal direction of the inclusions 8.

Although cases (FIGS. 10 and 11) are illustrated where the longitudinal direction of the inclusions 8 and the metal flow lines lie substantially parallel to the axial direction X, the present invention is not limited to such cases. The longitudinal direction of the inclusions 8 and the metal flow lines only need to be substantially parallel to the abutting surface P, and may be in any orientation within the abutting surface P. For example, the longitudinal direction of the inclusions 8 and the metal flow lines may lie substantially parallel to the width direction Y as shown in FIGS. 13 and 14 (i.e., substantially perpendicular to the axial direction X), or may cross the axial direction X and the width direction Y.

Figure 13:
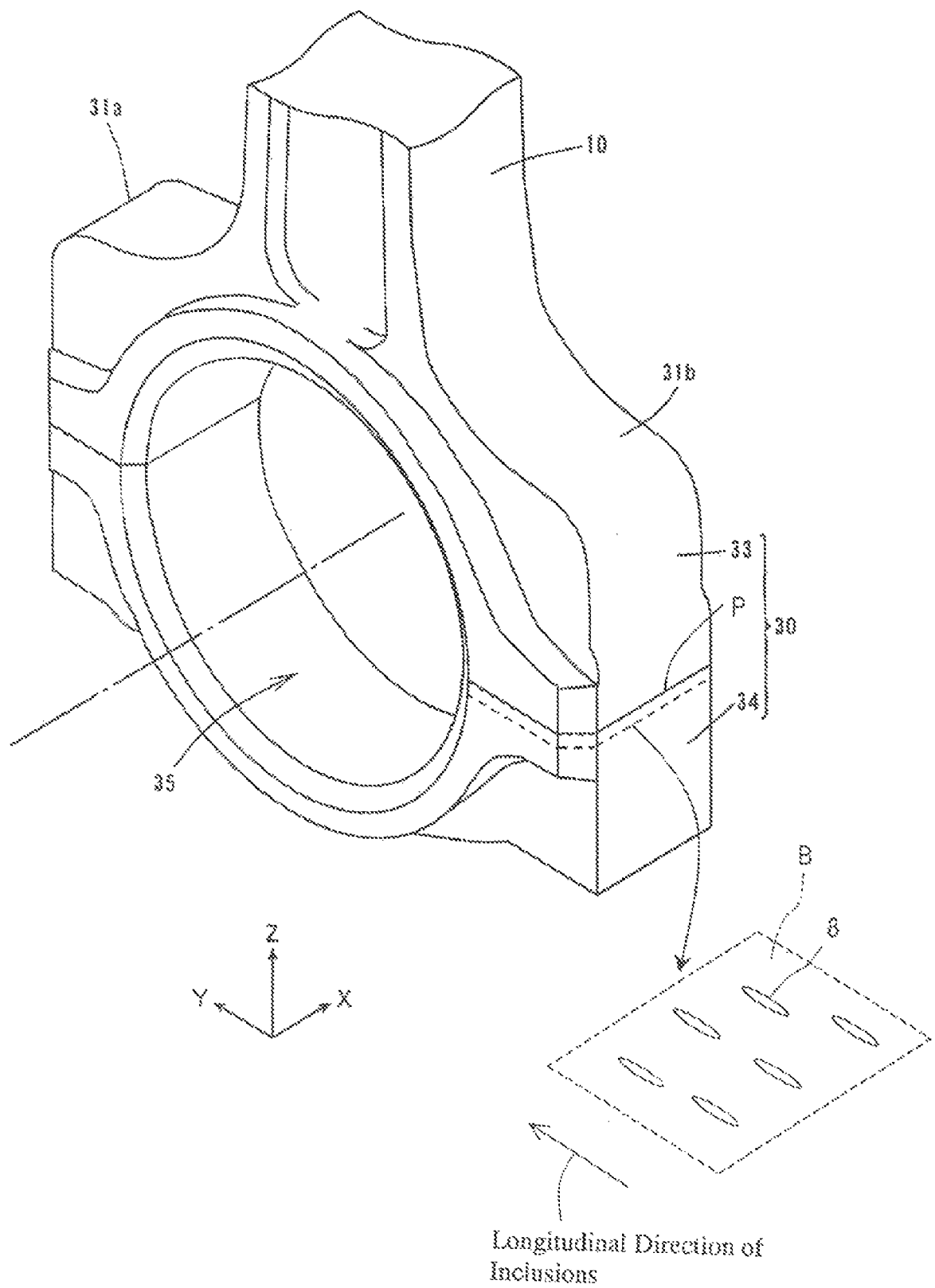
FIG. 13 is a diagram schematically showing how inclusions may be present in the area near an abutting surface between a rod portion and a cap portion.
Figure 14:
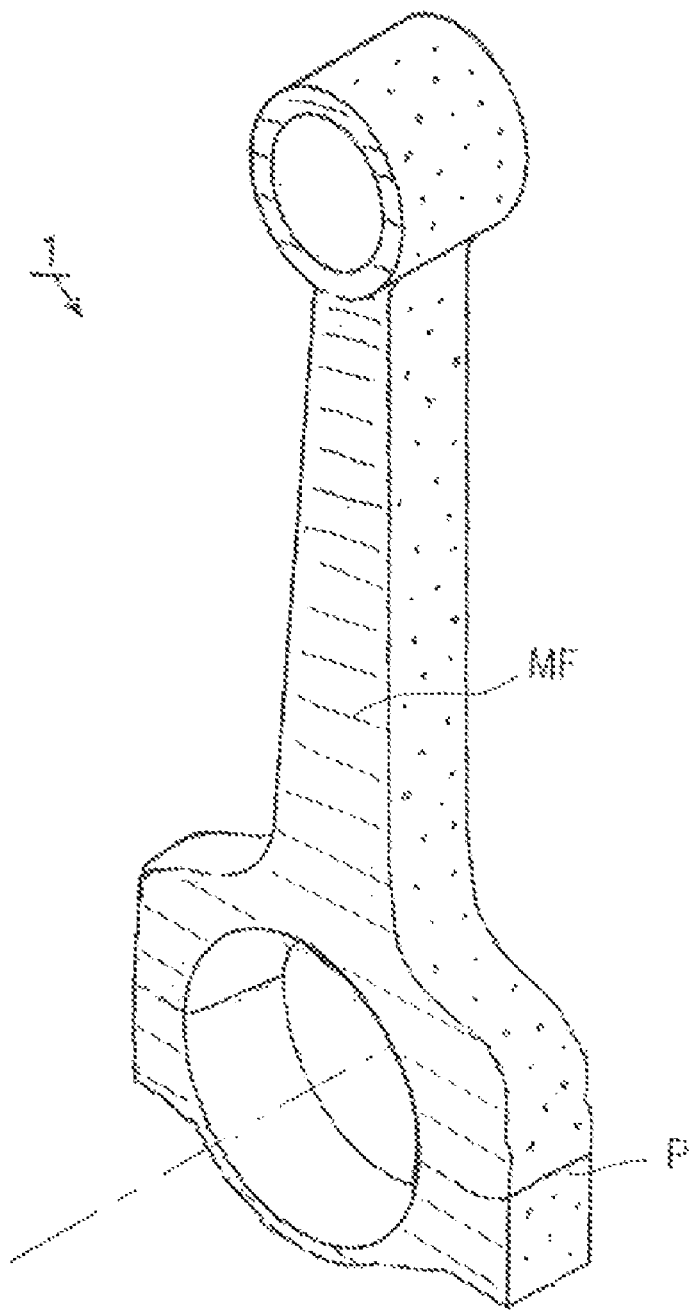
FIG. 14 is a diagram schematically showing metal flow lines of a connecting rod according to a preferred embodiment of the present invention.

However, from the standpoint of more effectively preventing the deformation of the big end 30 during operation, it is preferable that the longitudinal direction of the inclusions 8 is substantially parallel to the axial direction X as shown in FIG. 10, rather than substantially parallel to the width direction Y as shown in FIG. 13. Since the inclusions 8 each having an anisotropic shape serve as beginning points of fracture, the ruggednesses of the fractured surface F tend to be formed so that their ridges extend substantially parallel to the longitudinal direction of the inclusions 8. Therefore, if the longitudinal direction of the inclusions 8 is prescribed so as to be substantially parallel to the axial direction X, the ruggednesses of the fractured surface F will also be formed so that their ridges extend substantially parallel to the axial direction X. As a result, a more enhanced rigidity is provided against the force acting to shrink the rod portion 33 of the big end 30 inwards (i.e., a force acting substantially parallel to the width direction Y, which is substantially perpendicular to the axial direction X), whereby the deformation as shown in FIG. 48 can be more effectively prevented.

Moreover, as shown in FIG. 15, the longitudinal direction of the inclusions 8 and the metal flow lines may be tilted with a relatively small angle against the abutting surface P. When the angle θ between the longitudinal direction of the inclusions 8 and the abutting surface P is no less than 0° and no more than about 30°, the fracture split can be performed more easily than conventionally. The reason for this will be described with reference to FIGS. 16A to 16C.

Figure 16A:
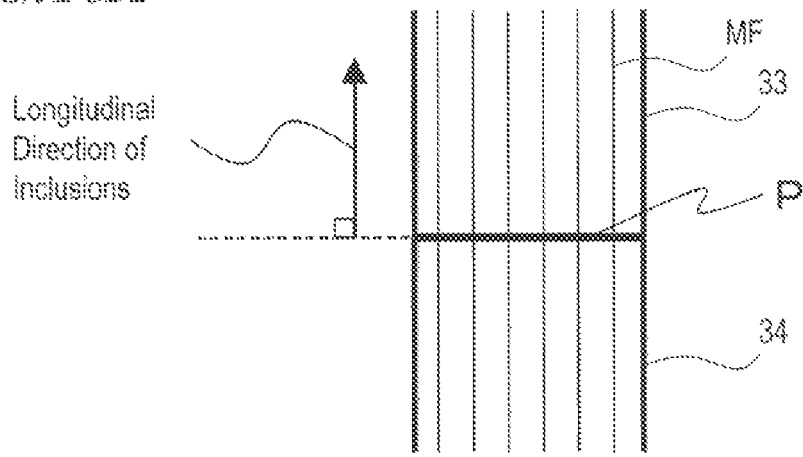
FIGS. 16A, 16B and 16C are diagrams for explaining a preferable range of the angle between the longitudinal direction of inclusions and an abutting surface.

As shown in FIG. 16A, in the case where the angle θ between the longitudinal direction of the inclusions 8 and the abutting surface P is about 90°, a fracture is to be effected along a plane which is substantially perpendicular to the metal flow lines. Therefore, the fracture split must occur so as to cut through the fibrous metallographical structures.

Figure 16B:
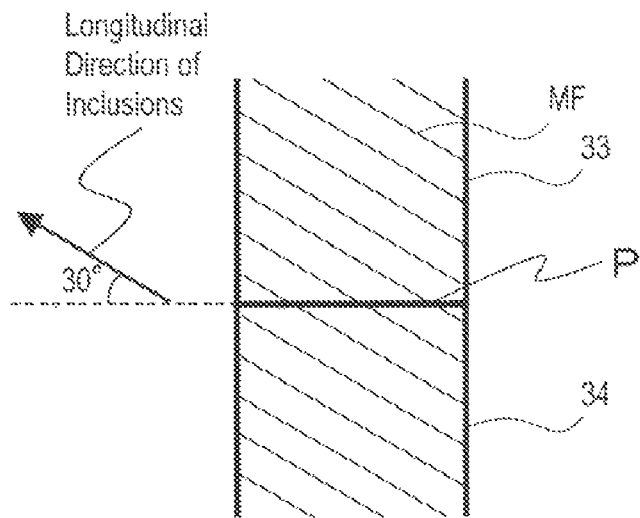

On the other hand, as shown in FIG. 16B, in the case where the longitudinal direction of the inclusions 8 is tilted with a relatively small angle against the abutting surface P, a fracture is to be effected along a plane which crosses the metal flow lines, but is still easier to perform than the fracture in the case illustrated in FIG. 16A. This is because the number of fibrous structures to be cut is reduced, as will be clear from comparing FIG. 16B with FIG. 16A in terms of the number of solid lines MF (which schematically represent metal flow lines) that cross the abutting surface P. For example, if the angle θ between the longitudinal direction of the inclusions 8 and the abutting surface P is 30°, as exemplified in FIG. 16B, the number of fibrous structures to be cut is reduced to about ½.

Figure 16C:
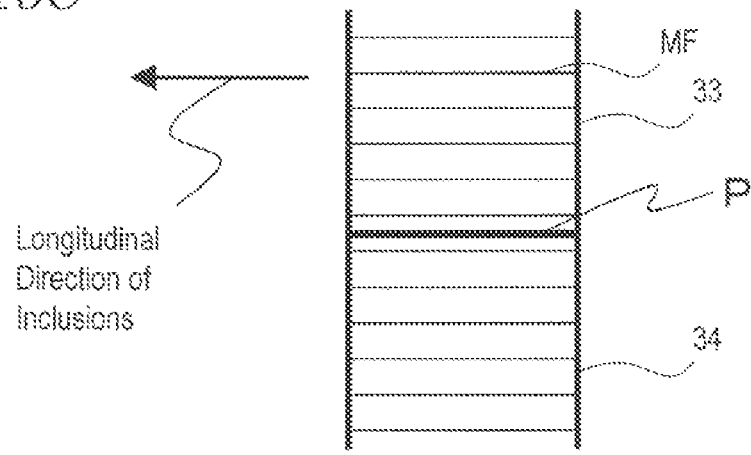

Moreover, as shown in FIG. 16C, in the case where the angle θ between the longitudinal direction of the inclusions 8 and the metal flow lines and the abutting surface P is 0°, a fracture is to be effected along a plane which is substantially parallel to the metal flow lines. In this case, the fracture split can be even more easily performed.

Thus, by prescribing the angle θ between the longitudinal direction of the inclusions 8 and the abutting surface P to be no less than 0° and no more than about 30°, the number of fibrous structures to be fractured can be reduced to less than about ½ from the case where θ=90°. As a result, the fracture split can be performed sufficiently easily.

Moreover, in the big end 30 of the connecting rod 1 according to the present preferred embodiment, as shown in FIG. 2, bottomed holes preferably define the bolt holes 32, which extend from the cap portion 34 toward the rod portion 33 and each of which has a bottom surface 32s inside the rod portion 33. Therefore, the portion of each bolt hole 32 defining its bottom serves to reinforce the rod portion 33. As a result, the rigidity of the rod portion 33 can be enhanced as compared to the case where throughholes are formed in the rod portion 33 as the bolt holes.

From the standpoint of realizing a higher rigidity, it is preferable that the portion of each bolt hole 32 defining its bottom has more than a certain thickness. Specifically, the shortest distance from the bottom surface 32s of each bolt hole 32 to the outer surface of the rod portion 33 is preferably about 3 mm or more, and more preferably about 4 mm or more.

Note that throughholes may still be formed as the bolt holes. Even in the case where the bolt holes are throughholes, sufficient rigidity can be ensured so long as the level differences in each fractured surface F is about 230 μm or more.

Figure 17:
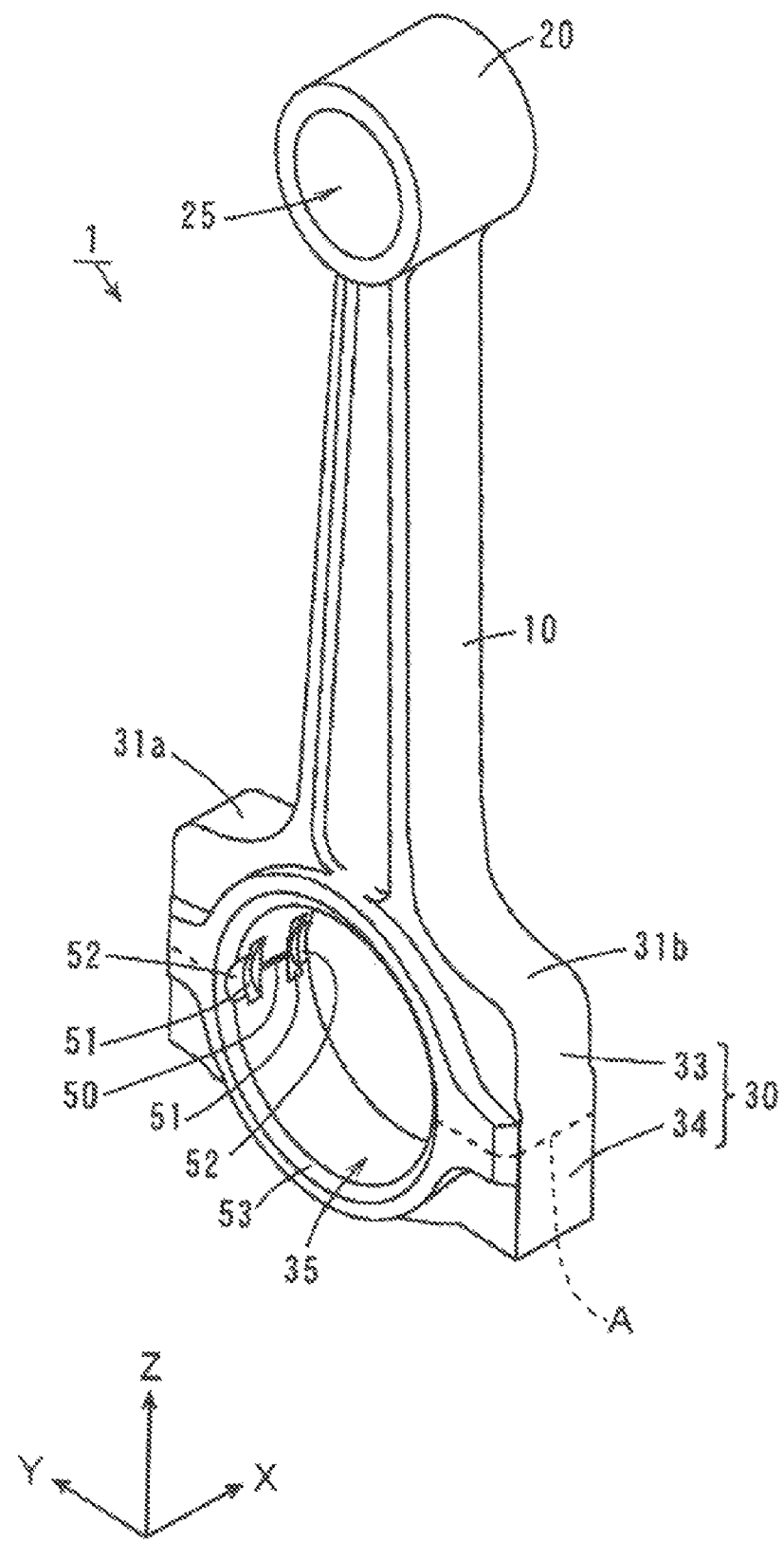
FIG. 17 is a perspective view which schematically shows a connecting rod according to a preferred embodiment of the present invention before undergoing a fracture split.
Figure 18:
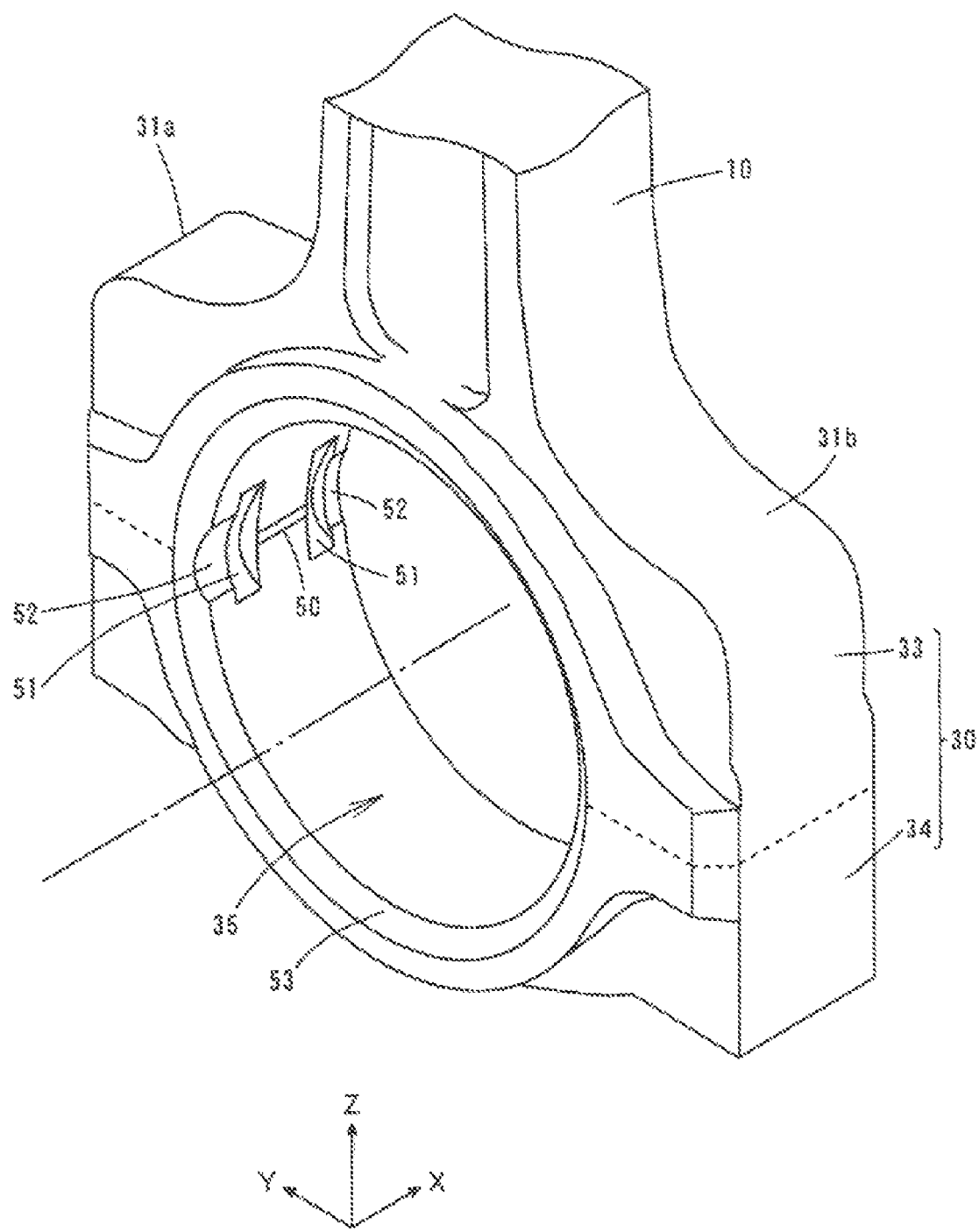
FIG. 18 is an enlarged perspective view showing a portion of the connecting rod shown in FIG. 17.

Next, a production method for the connecting rod 1 according to the present preferred embodiment will be described. Herein, the production method will be described by taking a connecting rod 1 shown in FIGS. 17 and 18 as an example. FIGS. 17 and 18 are diagrams showing a connecting rod 1 before undergoing a fracture split, and specifically illustrate an example of preferable structures to be formed on the inner peripheral surface of the crankpin hole 35. Hereinafter, these structures will be briefly described, followed by a description of the production method for the connecting rod 1.

On the inner peripheral surface of the crankpin hole 35, fracture beginning trenches 50 extending along the axial direction X are formed. Each fracture beginning trench 50 is positioned in a central portion of an area where the inner peripheral surface of the crankpin hole 35 and the intended fracture surface A cross each other. The fracture beginning trenches 50 are formed at opposing positions, across from each other, on the inner peripheral surface of the crankpin hole 35.

On both sides of each fracture beginning trench 50, bearing seizure grooves 51 for seizing a bearing metal which functions as a bearing is formed. The bearing seizure grooves 51 prohibit rotation of the bearing metal. Each bearing seizure groove 51 includes a recess having a curved bottom surface, and extends along the circumferential direction of the crankpin hole 35. On any cross section that is substantially perpendicular to the axial direction X, the bottom surface of each bearing seizure groove 51 appears to be curved so as to have an arc shape.

Furthermore, notches 52 are provided on farther sides of the respective bearing seizure grooves 51. Each notch 52 preferably has a curved bottom surface, and extends along the circumferential direction of the crankpin hole 35. On a cross section that is substantially perpendicular to the axial direction X, the bottom surface of each notch 52 appears to be curved so as to have an arc shape. Moreover, by chamfering each edge of the crankpin hole 35, chamfered portions 53 which extend along the circumferential direction of the crankpin hole 35 are provided.

Figure 19:
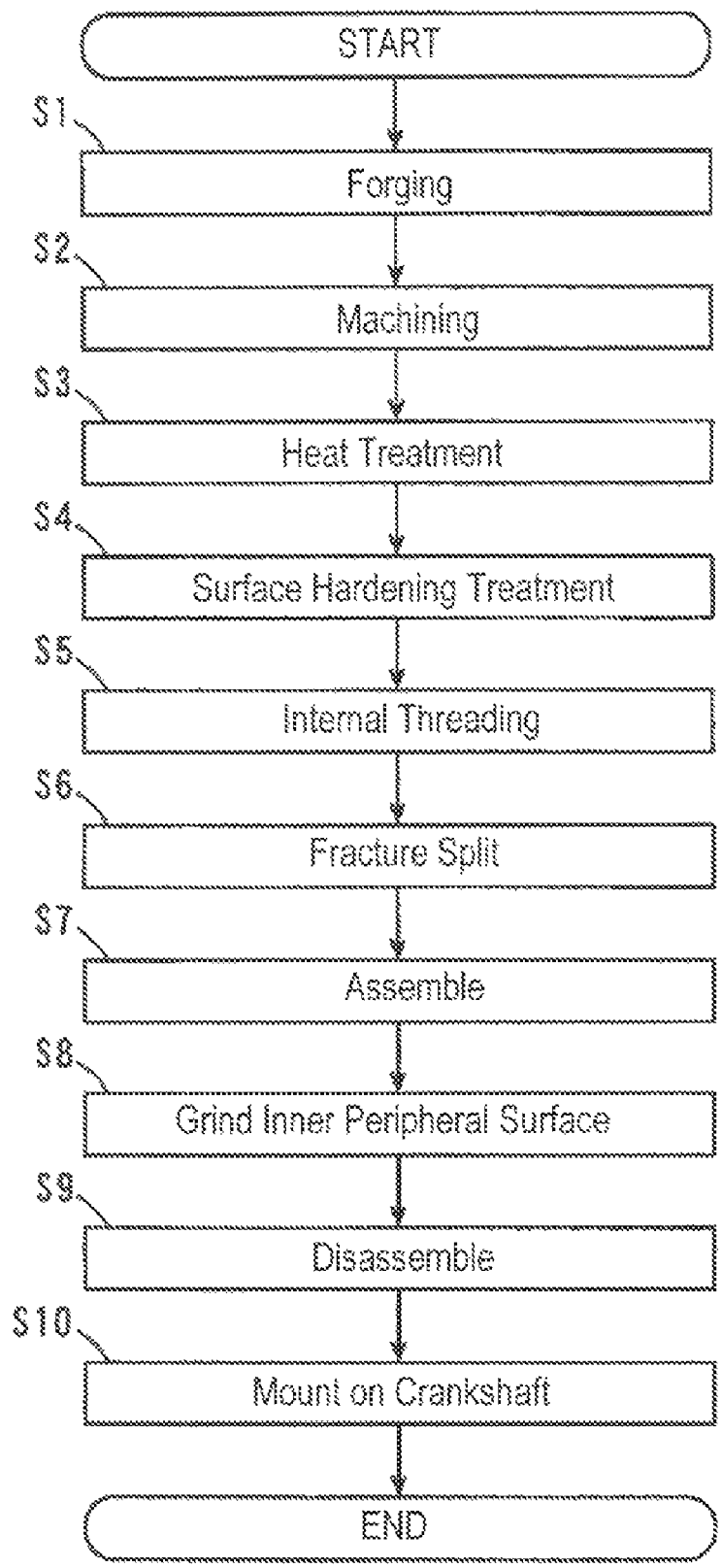
FIG. 19 is a flowchart showing a production method for a connecting rod according to a preferred embodiment of the present invention.

Next, a production method for the connecting rod 1 will be described. FIG. 19 is a flowchart showing the production method according to the present preferred embodiment.

Figure 20:
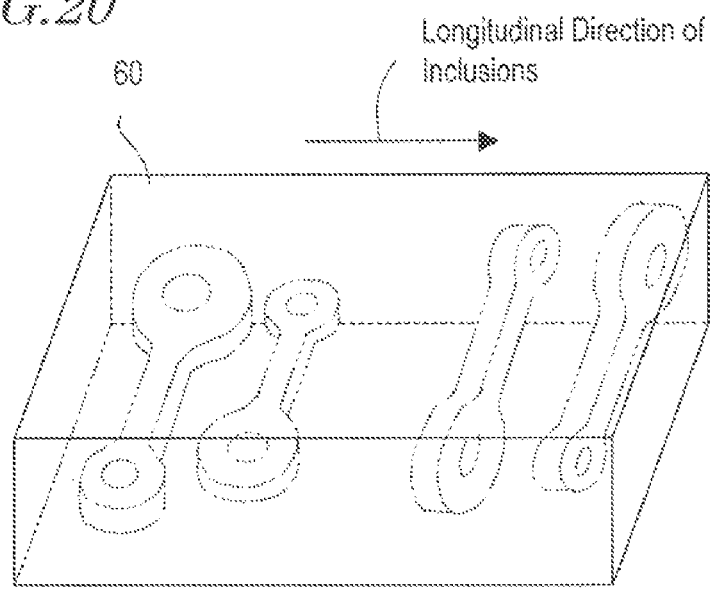
FIG. 20 is a diagram showing an example of cutting out a blank connecting rod from a plate member.
Figure 21:
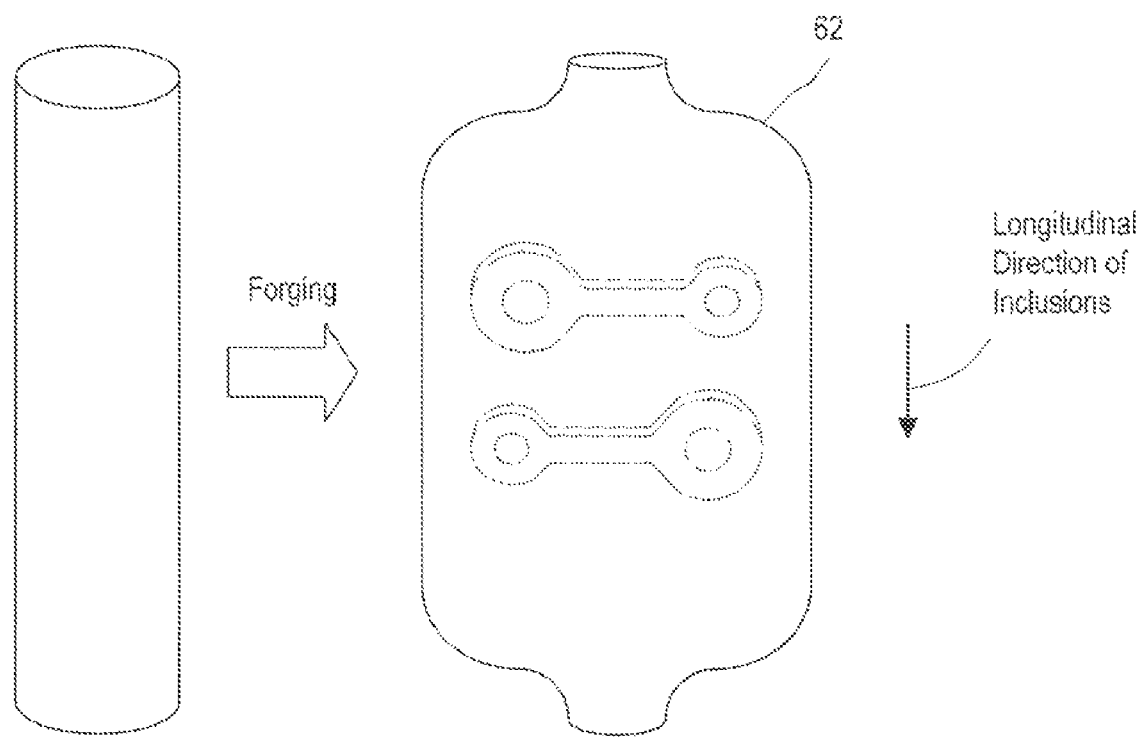
FIG. 21 is a diagram showing an example of cutting out a blank connecting rod from a plate member.

First, by using a titanium alloy, a blank connecting rod 1 which includes a rod main body 10, a small end 20, and a big end 30 is formed through forging (step S1). For example, a titanium alloy ingot may be prepared, and subjected to hot forging so as to form plate members 60 and 62 shown in FIGS. 20 and 21. Thereafter, from the plate members 60 and 62, blank connecting rods may be cut out as indicated by dotted lines in FIGS. 20 and 21. Note that the longitudinal direction of the inclusions 8 and the metal flow lines will follow along the direction of deformation during plastic processing, such as rolling or forging. Therefore, by forming the blank connecting rod in such a manner that the direction of plastic deformation is substantially perpendicular to the longitudinal direction of the blank connecting rod, it can be ensured that the longitudinal direction of the inclusions 8 and the metal flow lines are substantially parallel to an intended fracture surface A (i.e., an abutting surface P after split). Note that the method for forming the blank connecting rod is not limited to the above-illustrated hot forging, but may also be cold forging or machining from a rolling material.

In the present preferred embodiment, as a titanium alloy material, a titanium alloy whose composition is Ti-3Al-2V-S-REM (a rare-earth element, which may specifically be La or Ce) is used, e.g., DAT52F from Daido Tokushu Steel Company. In the present specification, a "titanium alloy" is defined as an alloy which contains titanium as a main component and to which at least one of Al, V, Fe, Mo, Cr and C (preferably at least Al) is added in an amount of no less than 0.5 wt % and no more than 10.0 wt %.

By using a titanium alloy which includes a rare-earth element and sulfur, a compound therebetween can be allowed to exist as inclusions within the titanium alloy, whereby a fracture split can be facilitated as already described above. This is also an easy way to ensure that the level differences in each fractured surface F are about 230 μm or more. In order to form inclusions within a titanium alloy, it is preferable that the rare-earth element (e.g., La, Ce, Pr, Nd) content is preferably no less than about 0.05 wt % and no more than about 0.7 wt %, and that the sulfur content is no less than about 0.05 wt % and no more than about 0.2 wt %.

Furthermore, a titanium alloy which contains no less than about 2.5 wt % and no more than about 6.75 wt % of aluminum as well as no less than about 1.6 wt % and no more than about 4.5 wt % of vanadium has excellent hardness. By using such a titanium alloy, the mechanical strength can be improved and the brittle fracture can be facilitated.

Figure 22:
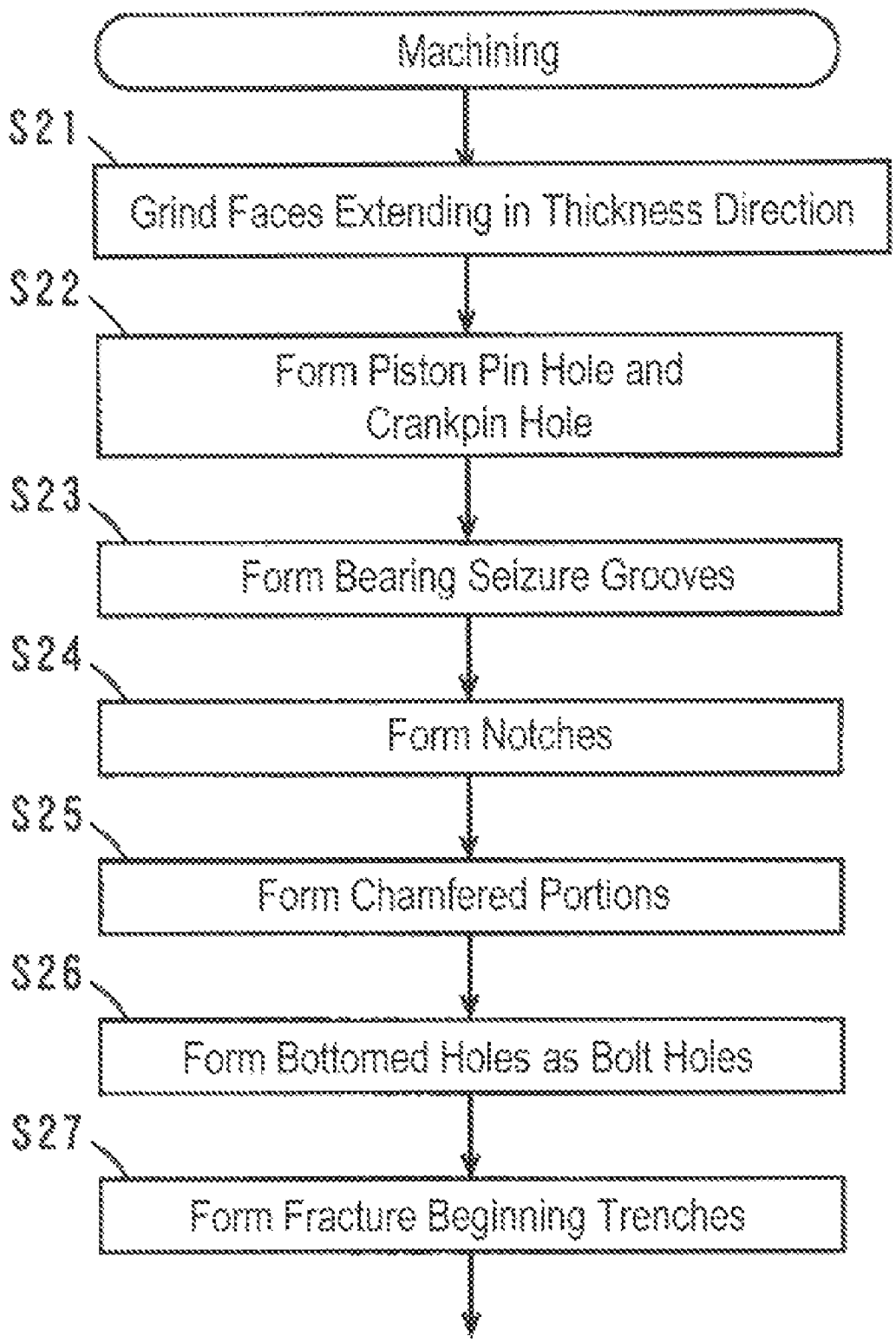
FIG. 22 is a flowchart showing specific steps of machining.

Next, machining is performed for the connecting rod 1 (step S2). FIG. 22 is a flowchart showing specific steps of machining. First, the surfaces extending in the thickness direction (i.e., the surfaces that are substantially perpendicular to the axial direction X) of the connecting rod 1 are ground (step S21), and then, a piston pin hole 25 and a crankpin hole 35 are formed in the small end 20 and the big end 30, respectively (step S22).

Next, bearing seizure grooves 51 are formed on the inner peripheral surface of the crankpin hole 35 of the big end 30 (step S23). Thereafter, notches 52 are provided on farther sides of the respective bearing seizure grooves 51 (step S24). Then, chamfered portions 53 are formed on the edges of the crankpin hole 35 (step S25). The formation of the piston pin hole 25, the crankpin hole 35, bearing seizure grooves 51, the notches 52, and the chamfered portions 53 is performed through cutting.

Thereafter, bottomed holes are formed as the bolt holes 32 in the big end 30 (step S26). The formation of the bolt holes 32 is performed through cutting, e.g. by using a drill. Moreover, the formation of the bolt holes 32 is typically performed so that the shortest distance from the bottom surface 32s of each bolt hole 32 to the outer surface of the rod portion 33 is about 0.5 mm to about 5 mm (and preferably about 3 mm or more).

Finally, fracture beginning trenches 50 are formed on the inner peripheral surface of the crankpin hole 35 (step S27). In the present preferred embodiment, the fracture beginning trenches 50 are formed through wire cut electro-discharge machining.

In wire cut electro-discharge machining, electrically conductive wires are placed along the axial direction X of the inner peripheral surface of the crankpin hole 35, and high voltage pulses are applied between the electrically conductive wires and the inner peripheral surface of the crankpin hole 35. As a result, corona discharge is caused between the electrically conductive wires and the inner peripheral surface of the crankpin hole 35, whereby the inner peripheral surface of the crankpin hole 35 is linearly ground off. Thus, in the central portion (on each side) of the inner peripheral surface of the crankpin hole 35, a fracture beginning trench 50 which linearly extends along the axial direction X is formed. By wire cut electro-discharge machining, it is possible to form the fracture beginning trenches 50 simultaneously on a plurality of connecting rods 1, whereby the production efficiency is improved. Note that the fracture beginning trenches 50 may also be formed through any other type of machining, such as laser processing or cutting.

Grinding of the surfaces extending in the thickness direction of the connecting rod 1, formation of the piston pin hole 25 and the crankpin hole 35, formation of the bearing seizure grooves 51, formation of the notches 52, formation of the chamfered portions 53, formation of the bolt holes 32, and formation of the fracture beginning trenches 50 can be performed in any arbitrary order, without being limited to the illustrated order in FIG. 22. For example, the bearing seizure grooves 51, the notches 52, and the chamfered portions 53 may be formed after the fracture beginning trenches 50 are formed.

Next, the connecting rod 1 is subjected to a heat treatment (step S3 in FIG. 19); in the present preferred embodiment, an annealing treatment, a solution treatment, and an aging treatment are consecutively performed. Exemplary conditions for these treatments are shown in Table 1. Table 1 also shows Rockwell hardness (HRC) values of the connecting rod 1 as taken after the annealing treatment and as taken after the solution treatment/aging treatment.

TABLE 1

| | temperature | time | cooling method | Hardness |
|---|---|---|---|---|
| annealing treatment | 740° C. | 2 hours | air cooling | 25-28HRC |
| solution treatment | 890° C. | 1 hour | water cooling | 35-38HRC |
| aging treatment | 540° C. | 4 hours | air cooling | |

From the standpoint of improving the mechanical strength of the connecting rod 1 and the standpoint of facilitating brittle fracture, it is preferable that the Rockwell hardness after the heat treatment is about 33 HRC or more.

Next, the connecting rod 1 is subjected to a surface hardening treatment (step S4). Thereafter, internal threading is provided on the bolt holes 32 of the big end 30 (step S5). The surface hardening treatment may be performed by, for example, coating the surface of the connecting rod 1 with chromium nitride by using a PVD technique. Alternatively, the surface hardening treatment may be performed after a grinding of the inner peripheral surfaces (step S8; described later) is performed.

Next, the big end 30 of the connecting rod 1 is fracture split into the rod portion 33 and the cap portion 34 (step S6).

Figure 23:
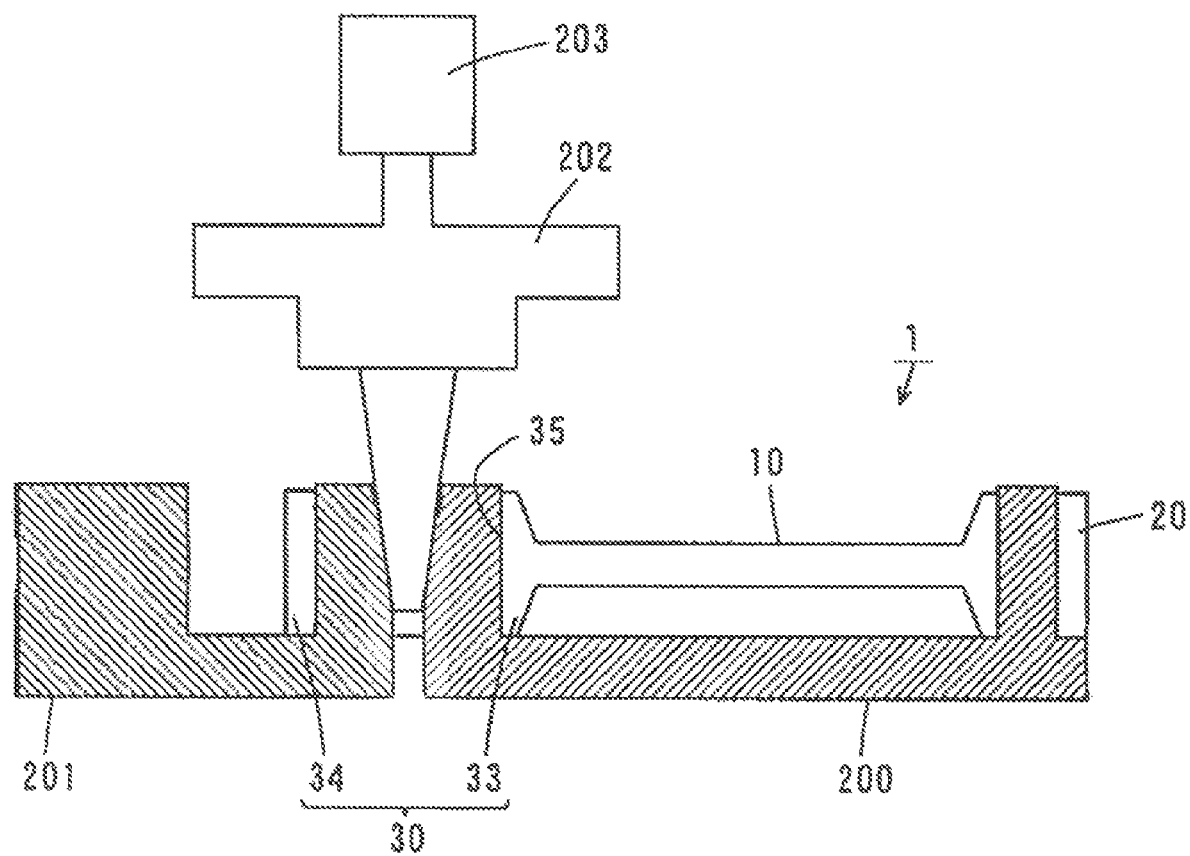
FIG. 23 is a cross-sectional view showing an example of a fracture split technique.

FIG. 23 shows an example of a fracture split technique. As shown in FIG. 23, protrusions of sliders 200 and 201 which are capable of moving along the horizontal direction are inserted in the crankpin hole 35 of the big end 30 of the connecting rod 1, and a wedge 202 is driven in between the protrusions of the sliders 200 and 201 by using a weight 203. As a result, the big end 30 of the connecting rod 1 is fracture-split along the intended fracture surface A, the fracture beginning trenches 50 serving as beginning points of fracture, whereby the big end 30 is divided into the rod portion 33 and the cap portion 34.

Note that, before performing the step of fracture-splitting the big end 30, it is preferable to cool the big end 30 below a predetermined temperature (e.g., about −40° C. or below) in advance. The cooling of the big end 30 can be performed by soaking the connecting rod 1 into liquid nitrogen, for example. By performing such a cooling step before the fracture split step, the fracture split of the connecting rod 1 made of a titanium alloy can be facilitated.

Conventionally, such a cooling step has occasionally been performed for a fracture split-type connecting rod which is made of steel. The reason is that, in the case of a steel connecting rod, the mode of fracturing under an applied load changes from ductile fracture to brittle fracture at a temperature (called "ductile-brittle transition temperature") which is room temperature or below. Thus, a cooling step is known to facilitate its fracture split.

However, a titanium alloy has a ductile-brittle transition temperature above room temperature. Although this fact would appear to destroy the significance of performing a cooling step, the inventors have nonetheless attempted a cooling step, without being preoccupied with such technological common knowledge. As a result, the inventors have experimentally confirmed that fracture split of a connecting rod made of a titanium alloy is also facilitated by a cooling step. The presumable reason for the facilitated fracture split is the lowering, even if by a small amount, of toughness.

Next, bolts 40 are inserted in the bolt holes 32 while keeping the fractured surface F of the rod portion 33 and the fractured surface F of the cap portion 34 in contact and in place, the rod portion 33 and the cap portion 34 are assembled (step S7 in FIG. 19).

Next, the inner peripheral surfaces of the piston pin hole 25 of the small end 20 and the crankpin hole 35 of the big end 30 of the assembled connecting rod 1 are ground (step S8). Thus, the split-type connecting rod 1 is produced.

Thereafter, the bolts 40 are removed from the big end 30 of the assembled connecting rod 1, whereby the rod portion 33 and the cap portion 34 are disassembled (step S9). Finally, the disassembled rod portion 33 and the cap portion 34 are mounted on a crankpin of a crankshaft (step S10).

In accordance with the production method of the present preferred embodiment, as described above, a connecting rod is prepared which preferably has inclusions whose longitudinal direction lies substantially parallel to an intended fracture surface, and this connecting rod is subjected to a fracture split. Thus, the fracture split is easy to perform. Moreover, since a connecting rod which preferably has inclusions in the area around its intended fracture surface is prepared, it is easy to sufficiently increase the level differences in each fractured surface.

Figure 24A:
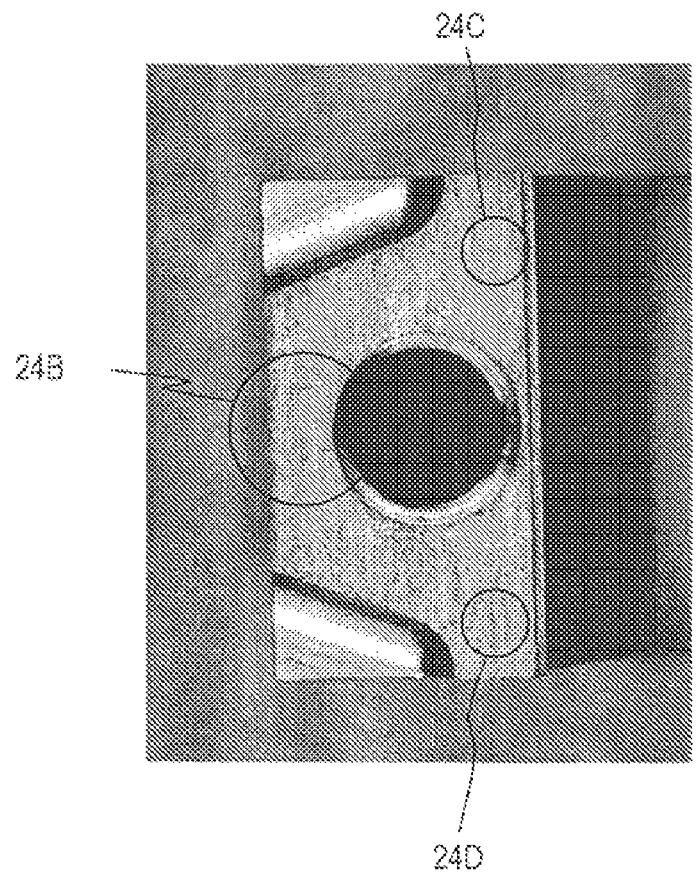
FIGS. 24A, 24B, 24C, 24D and 24E are photographs each showing a fractured surface of a big end of a connecting rod which has actually been produced.
Figure 24B:
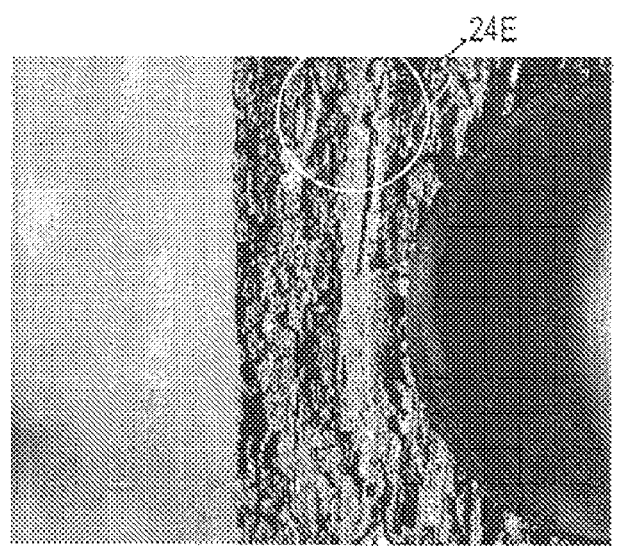
Figure 24C:
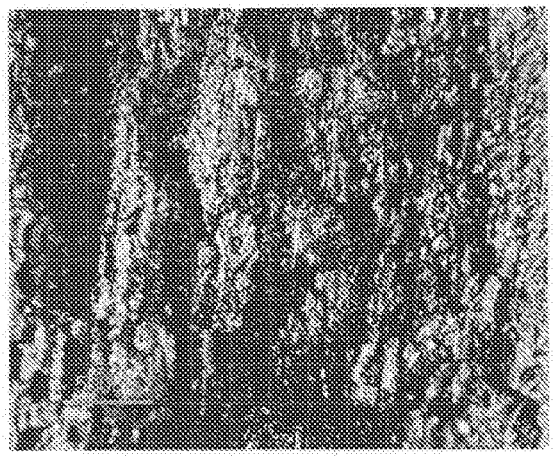
Figure 24D:
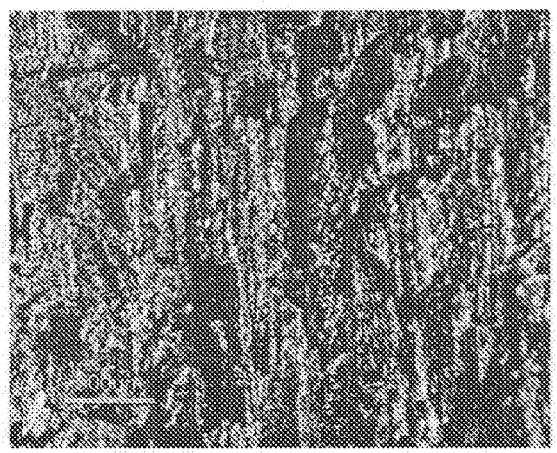
Figure 24E:
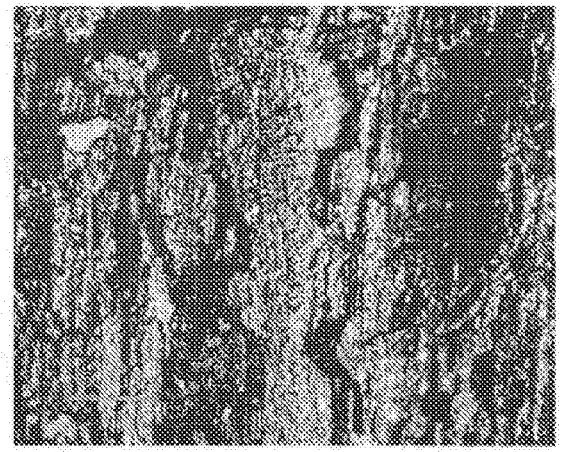

FIGS. 24A to 24E are photographs each showing a fractured surface of a big end 30 of a connecting rod 1 which has actually been produced. FIGS. 24B, 24C and 24D are enlarged photographs of encircled portions 24B, 24C and 24D in FIG. 24A. FIG. 24E is an enlarged photograph of an encircled portion 24E in FIG. 24B. The inclusions 8 and the metal flow lines are substantially parallel to the axial direction X (i.e., the vertical direction in the figures). As shown in FIGS. 24A to 24E, a brittle-fractured surface has been obtained with minute ruggednesses all over the entire fractured surface F, thus indicating that a good fracture split has been performed. Moreover, the ridges of the ruggednesses extend substantially parallel to the axial direction X, thus indicating that the ridges of the ruggednesses extend substantially parallel to the longitudinal direction of the inclusions 8. The level differences in each fractured surface F were measured to be about 230 μm or more.

The present preferred embodiment illustrates a case where a connecting rod is prepared which has inclusions whose longitudinal direction lies substantially parallel to an intended fracture surface. However, the longitudinal direction of the inclusions may also be tilted, so long as its angle with respect to the intended fracture surface is about 30° or less. A fracture split can be easily performed when the angle between the longitudinal direction of the inclusions and the abutting surface is no less than 0° and no more than about 30°.

Figure 25:
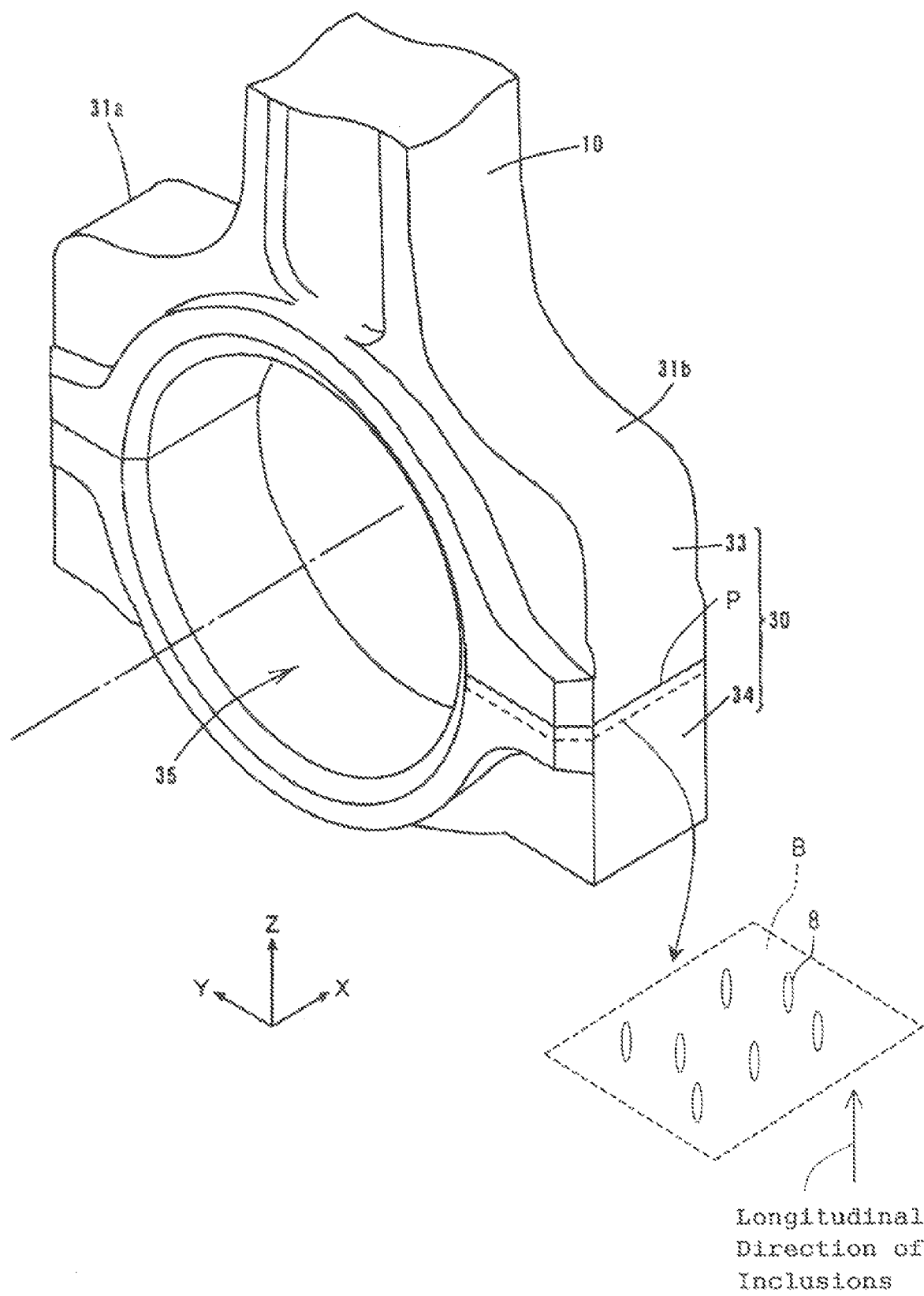
FIG. 25 is a diagram schematically showing how inclusions may be present in the area near an abutting surface between a rod portion and a cap portion.

Alternatively, as shown in FIG. 25, the longitudinal direction of the inclusions 8 may be substantially perpendicular to the abutting surface P. When the longitudinal direction of the inclusions 8 is substantially perpendicular to the abutting surface P, the fracture split will become more difficult because the metal flow lines are substantially parallel to the longitudinal direction Z of the connecting rod 1 (see FIG. 12), but the mechanical strength of the connecting rod 1 will be improved. Specifically, the fatigue strength against any stress in a direction of deflecting the axis of the connecting rod 1 will be improved by about 5% to about 10%. It will also facilitate die designing, and improve the production yield.

In the case where the metal flow lines are substantially parallel to the longitudinal direction Z of the connecting rod 1, too, the inclusions 8 being contained in the area around the fractured surfaces F of the rod portion 33 and the cap portion 34 make it possible to sufficiently increase the level differences in each fractured surface F, so as to be about 230 μm or more.

Figure 26:
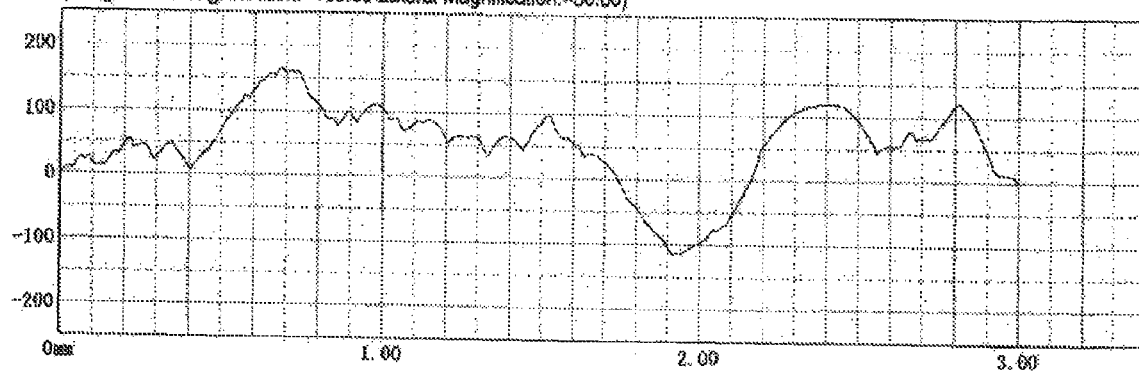
FIG. 26 is a graph showing a cross-sectional curve of a fractured surface, with respect to a connecting rod that contains inclusions (Example).
Figure 27:
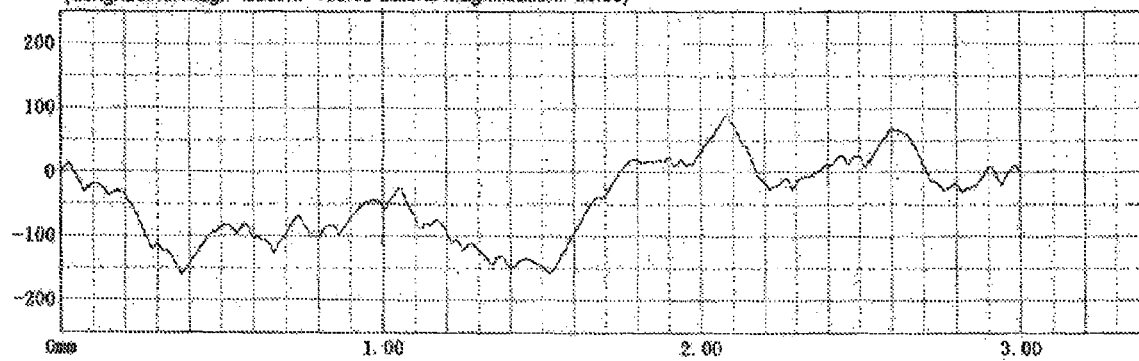
FIG. 27 is a graph showing a cross-sectional curve of a fractured surface, with respect to a connecting rod that contains inclusions (Example).
Figure 28:
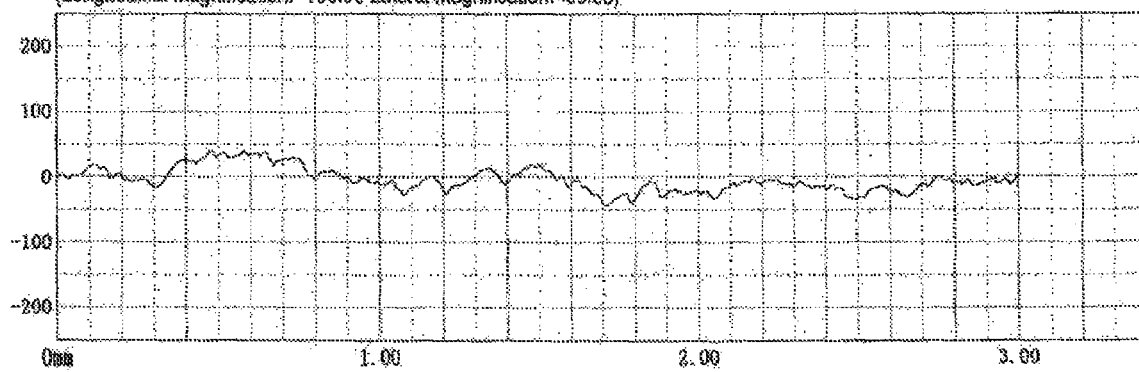
FIG. 28 is a graph showing a cross-sectional curve of a fractured surface, with respect to a connecting rod that contains no inclusions (Comparative Example).

FIGS. 26, 27 and 28 each show a cross-sectional curve (surface roughness) of a fractured surface, with respect to a connecting rod that has metal flow lines which are substantially parallel to the longitudinal direction Z. FIGS. 26 and 27 each show the surface roughness of a connecting rod that preferably has inclusions 8 whose longitudinal direction is substantially perpendicular to the abutting surface P (Examples). FIG. 28 shows the surface roughness of a connecting rod that has no inclusions 8 (Comparative Example).

From comparisons between FIGS. 26, 27 and 28, it can be seen that the level differences in each fractured surface are greater when inclusions 8 are included. Specifically, the level differences in each fractured surface are about 279 μm in the Example shown in FIG. 26 (where the titanium alloy material is of the composition Ti-3Al-2V), and about 248 μm in the Example shown in FIG. 27 (where the titanium alloy material is of the composition Ti-3Al-2V). On the other hand, in the Comparative Example shown in FIG. 28 (where the titanium alloy material is of the composition Ti-6Al-4V), the level differences in each fractured surface are about 85 μm.

The connecting rods according to the above-described Examples and Comparative Example were actually incorporated into engines, and subjected to engine tests. In the connecting rod of the Comparative Example whose cross-sectional curve is shown in FIG. 28, sticking of the bearing metal to the crankpin occurred occasionally. On the other hand, no such sticking occurred in the connecting rods of the Examples whose cross-sectional curves are shown in FIGS. 26 and 27 because of deformation of the big end 30 being suppressed.

In the case where the metal flow lines are substantially perpendicular to the abutting surface P, it becomes more difficult to perform fracture split than in the case where the metal flow lines are substantially parallel (or tilted at a relatively small angle) to the abutting surface P, and therefore it is preferable to increase the speed of fracture splitting and apply greater energy.

In the present preferred embodiment, as shown in FIGS. 17 and 18, the fracture beginning trenches 50, the bearing seizure grooves 51, and the notches 52 are formed on the inner peripheral surface of the crankpin hole 35. In order to prevent "double fracturing" at fracture split, it is more preferable that these elements are shaped so that the stress during fracture split will concentrate in the fracture beginning trenches 50. This point will be described in more detail.

Figure 29A:
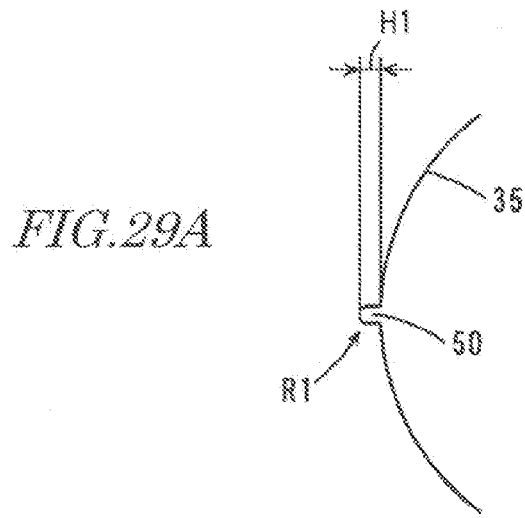
FIG. 29A is a cross-sectional view showing the shape of a fracture beginning trench.
Figure 29B:
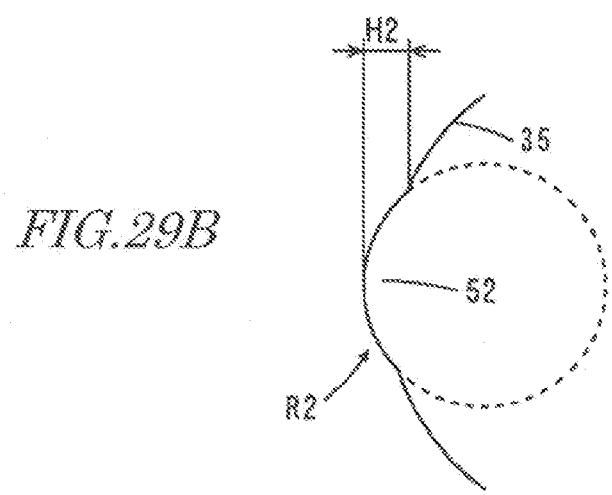
FIG. 29B is a cross-sectional view showing the shape of a notch.
Figure 29C:
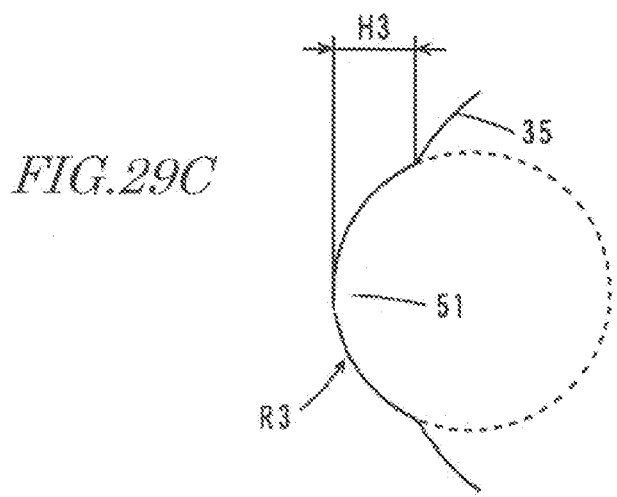
FIG. 29C is a cross-sectional view showing the shape of a bearing seizure groove.

FIGS. 29A, 29B and 29C respectively show cross-sectional shapes of a fracture beginning trench 50, a notch 52, and a bearing seizure groove 51.

As shown in FIG. 29A, each fracture beginning trench 50 includes opposing surfaces which are substantially parallel to each other, and a semicircular bottom surface. The fracture beginning trench 50 has a depth H1 of e.g., about 0.5 mm, and its bottom surface has a radius of curvature R1 of e.g., about 0.1 mm.

As shown in FIG. 29B, each notch 52 preferably includes a bottom surface having an arc shape. The notch 52 has a depth H2 of e.g., about 0.5 mm, and its bottom surface has a radius of curvature R2 of e.g., about 6.5 mm.

As shown in FIG. 29C, each bearing seizure groove 51 includes a bottom surface having an arc shape. The bearing seizure groove 51 has a depth H3 of e.g., about 1.6 mm, and its bottom surface has a radius of curvature R3 of e.g., about 6.5 mm.

The depth H2 of the notch 52 and the depth H3 of the bearing seizure groove 51 are equal to or greater than the depth H1 of the fracture beginning trench 50. In the present preferred embodiment, the depth H2 of the notch 52 is substantially equal to the depth H1 of the fracture beginning trench 50, and the depth H3 of the bearing seizure groove 51 is greater than the depth H1 of the fracture beginning trench 50. Moreover, the radius of curvature R2 of the bottom surface of the notch 52 is greater than the radius of curvature R1 of the bottom surface of the fracture beginning trench 50, and the radius of curvature R3 of the bottom surface of the bearing seizure groove 51 is greater than the radius of curvature R1 of the bottom surface of the fracture beginning trench 50.

Generally speaking, a stress concentration factor α is derived by equation (1) below. In equation (1), H represents the depth of a notch, and R represents the radius of curvature of the notch.

$$\alpha = 1 + 2\sqrt{(H/R)} \qquad (1)$$

In the case where the fracture beginning trench 50 has a depth H1 of about 0.5 mm and a radius of curvature R1 of about 0.1 mm, the stress concentration factor α is calculated to be about 5.5 from equation (1) above. In the case where the notch 52 has a depth H2 of about 0.5 mm and a radius of curvature R2 of about 6.5 mm, the stress concentration factor α is calculated to be about 1.6 from equation (1) above. In the case where the bearing seizure groove 51 has a depth H3 of about 1.6 mm and a radius of curvature R3 of about 6.5 mm, the stress concentration factor α is calculated to be about 2.0 from equation (1) above.

Thus, the stress concentration factor of the fracture beginning trench 50 is greater than the stress concentration factors of the notch 52 and the bearing seizure groove 51.

Therefore, stress concentrates in the fracture beginning trenches 50 of the inner peripheral surface of the crankpin hole 35, whereas stress concentration is alleviated in the notches 52 and the bearing seizure groove 51. As a result, stress concentrates in the central portion (on each side) of the inner peripheral surface of the crankpin hole 35.

Now, the action of the fracture beginning trenches 50 and the notches 52 during fracture split of the big end 30 will be described in more detail. First, the progress of a fracture of a big end 30 having no notches will be described with reference to FIGS. 30 to 33. Then, the progress of a fracture of a big end 30 having notches 52 will be described with reference to FIGS. 34 to 36.

Figure 30:
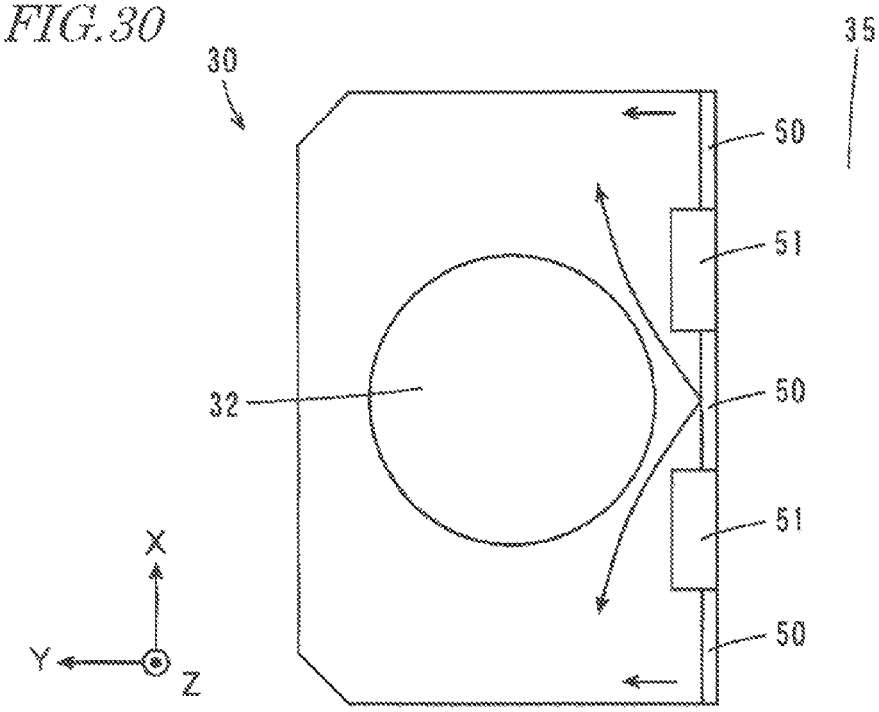
FIG. 30 is a diagram for explaining the progress of a fracture on an intended fracture surface of a big end having no notches.

In the big end 30 shown in FIG. 30, a pair of bearing seizure grooves 51 are formed on both sides of a fracture beginning trench 50 which is formed in the central portion of the inner peripheral surface of the crankpin hole 35. Fracture beginning trenches 50 are also formed on farther sides of the respective bearing seizure grooves 51 (i.e., at opposite ends of the inner peripheral surface of the crankpin hole 35).

Usually, stress is likely to concentrate in thin portions and end portions. Since a bolt hole 32 is provided in the central portion (on the illustrated cross section) of the big end 30, the central portion of the inner peripheral surface of the crankpin hole 35 becomes thin. Therefore, stress will concentrate at the central portion and the opposite ends of the inner peripheral surface of the crankpin hole 35.

Therefore, in the big end 30 shown in FIG. 30, there are three beginning points of fracture, including: the fracture beginning trench 50 in the central portion of the inner peripheral surface of the crankpin hole 35; and the fracture beginning trenches 50 at the opposite ends. As a result, as shown by arrows in FIG. 30, fracture will progress from the three points, i.e., the central portion and the opposite ends of the inner peripheral surface of the crankpin hole 35.

Figure 31:
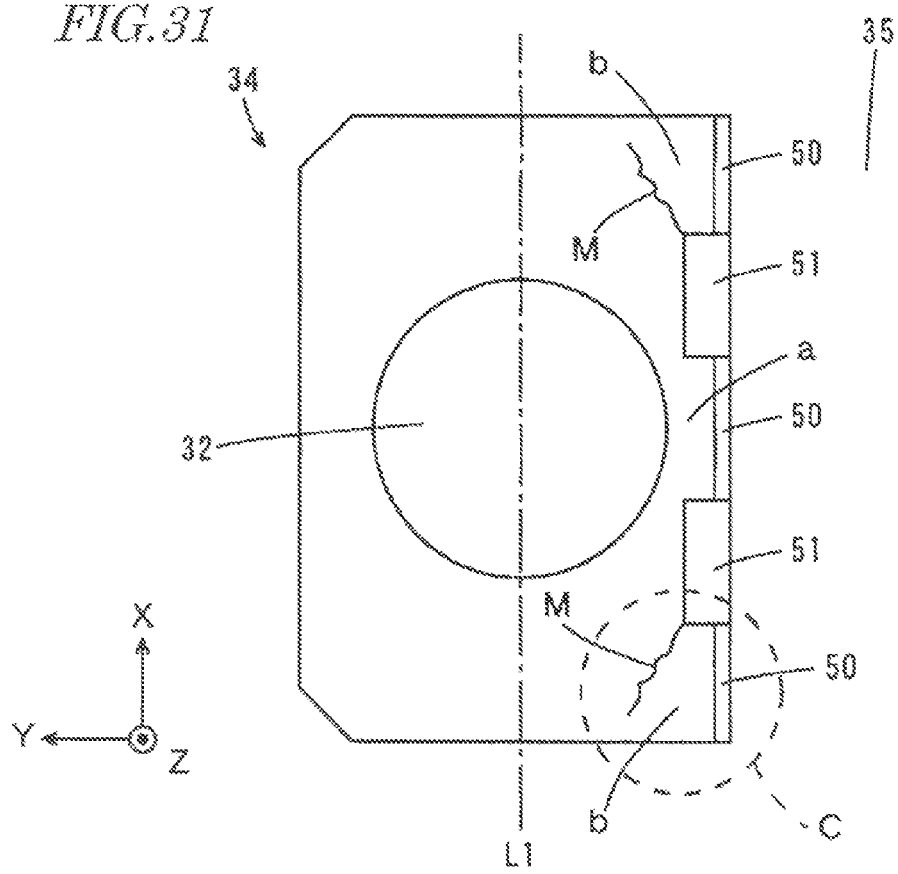
FIG. 31 is a diagram showing a state of a fractured surface of a big end having no notches.
Figure 32:
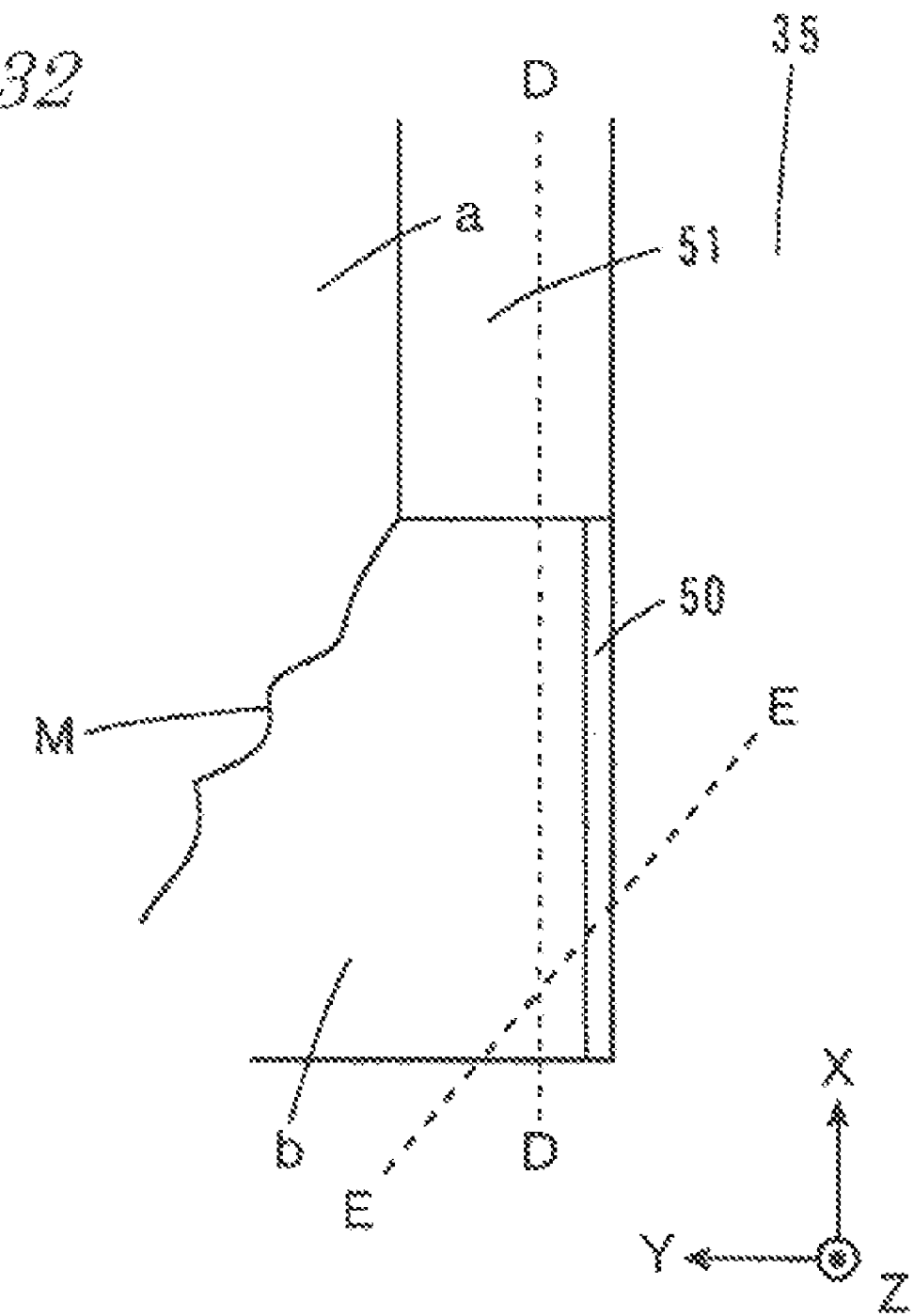
FIG. 32 is an enlarged view of portion C in FIG. 31.
Figure 33A:
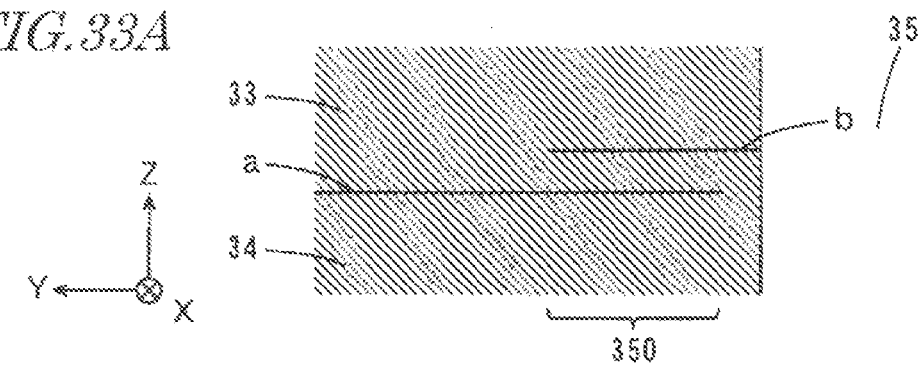
FIGS. 33A, 33B, 33C and 33D are cross-sectional views schematically showing steps from fracture of a big end having no notches to grinding of an inner peripheral surface.

In this case, as shown in FIGS. 31 and 32, a fractured surface a which is formed via fracture from the central portion of the inner peripheral surface of the crankpin hole 35 and a fractured surface b which is formed via fracture from the opposite ends of the inner peripheral surface of the crankpin hole 35 may occur at different heights. When these occur, as shown in FIG. 33A, there emerges a region 350 where the fractured surface a and the fractured surface b overlap at an interval from each other, thus resulting in double fracturing.

Note that, as shown in FIG. 32, the inner peripheral surface of the crankpin hole 35 is to be ground to line D-D in a subsequent step. Moreover, in a conventional production method for a split-type connecting rod, edges of the crankpin hole 35 are to be chamfered to line E-E in a step subsequent to fracture split.

Figure 33B:
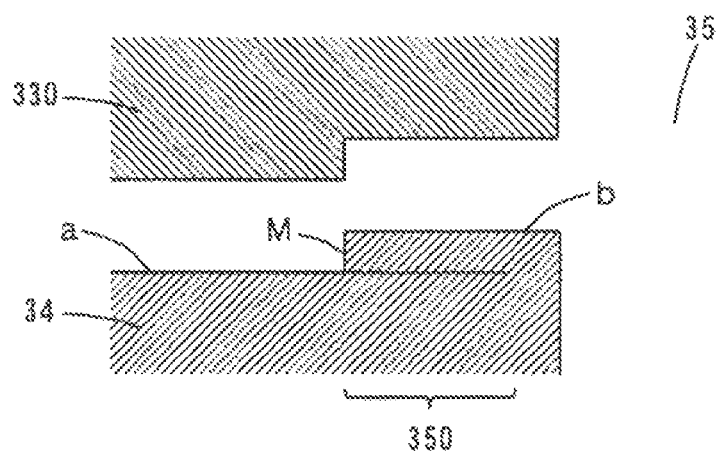

Next, when the rod portion 33 and the cap portion 34 are separated from each other as shown in FIG. 33B, a gap will occur at a merging point M of the fractured surface a and the fractured surface b. As shown in FIG. 31, the merging point M will occur in a position which is closer to the crankpin hole 35 than is the center line L1 of the big end 30 along the width direction Y.

Figure 33C:
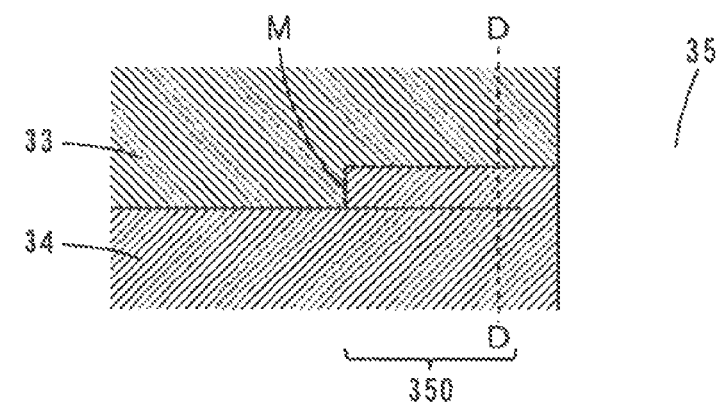
Figure 33D:
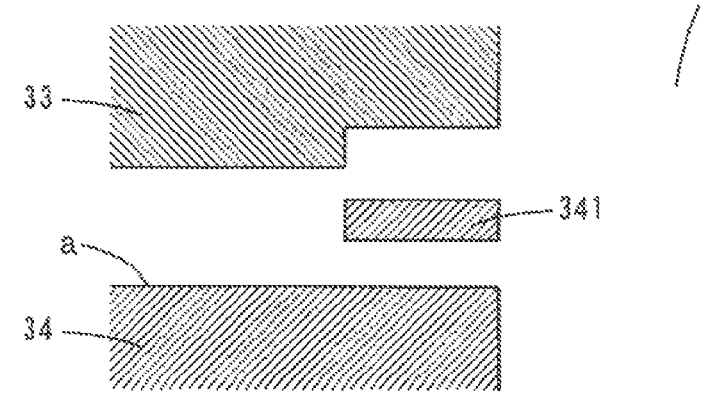

Then, after the rod portion 33 and the cap portion 34 are assembled as shown in FIG. 33C, the inner peripheral surface of the crankpin hole 35 is ground to line D-D. When the rod portion 33 and the cap portion 34 are disassembled as shown in FIG. 33D, a fraction 341 will be lost from the region 350 where the fractured surface a and the fractured surface b overlap.

On the other hand, in the big end 30 shown in FIG. 34, a pair of bearing seizure grooves 51 are formed on both sides of a fracture beginning trench 50 which is formed in the central portion of the inner peripheral surface of the crankpin hole 35. Notches 52 are formed on farther sides of the respective bearing seizure grooves 51 (i.e., at opposite ends of the crankpin hole 35). Furthermore, chamfered portions 53 are formed at edges of the crankpin hole 35.

Since the stress concentration factor of the notches 52 is smaller than the stress concentration factor of the fracture beginning trenches 50, stress concentration at the opposite ends of the crankpin hole 35 is alleviated. Since the chamfered portions 53 are formed at edges of the crankpin hole 35, stress concentration at the edges of the crankpin hole 35 is alleviated. As a result, stress will concentrate in the central portion of the inner peripheral surface of the crankpin hole 35.

Therefore, in the example shown in FIG. 34, there is only one beginning point of fracture, that is, the central portion of the inner peripheral surface of the crankpin hole 35. As a result, as shown by arrows in FIG. 34, fracture progresses from only one point, i.e., the central portion of the inner peripheral surface of the crankpin hole 35.

Figure 36A:
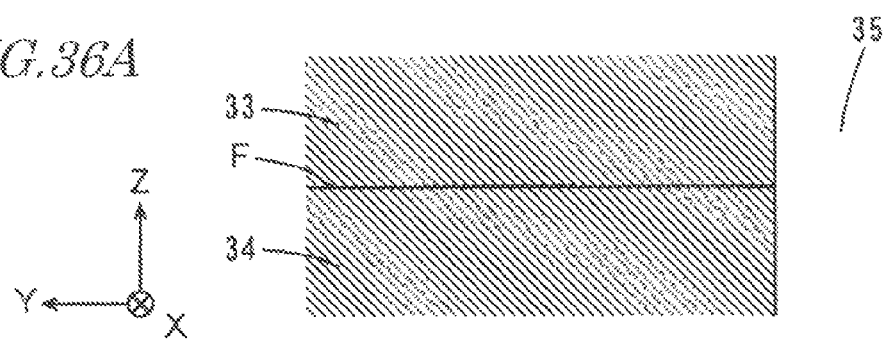
FIGS. 36A, 36B, 36C and 36D are cross-sectional views schematically showing steps from fracture of a big end having notches to grinding of an inner peripheral surface.

In this case, as shown in FIG. 35, a fractured surface F is formed via fracture from the central portion of the inner peripheral surface of the crankpin hole 35. As shown in FIG. 36A, the rod portion 33 and the cap portion 34 are fracture-split at this single fractured surface F, so that double fracturing does not occur.

Figure 36B:

Therefore, as shown in FIG. 36B, no gap occurs on the fractured surface F when the rod portion 33 and the cap portion 34 are separated from each other.

Figure 36C:
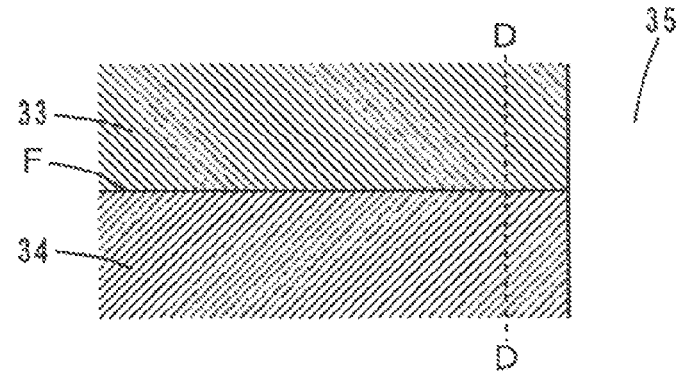
Figure 36D:
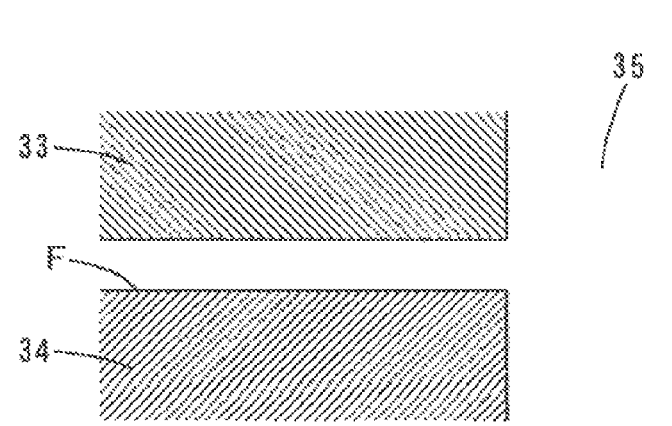

Then, after the rod portion 33 and the cap portion 34 are assembled as shown in FIG. 36C, the inner peripheral surface of the crankpin hole 35 is ground to line D-D. Even when the rod portion 33 and the cap portion 34 are disassembled as shown in FIG. 36D, no fractions will be lost.

Thus, in the case where the notches 52 are provided, as shown in FIG. 35, there is no overlapping of a plurality of fractured surfaces in the region between the center line L1 of the big end 30 (along the width direction Y) and the inner peripheral surface of the crankpin hole 35. Loss of fractions during grinding of the inner peripheral surface of the crankpin hole 35 is prevented if there is no overlapping of a plurality of fractured surfaces at least in the region lying between the inner peripheral surface of the crankpin hole 35 and a tangent L2 of the bolt hole 32 which extends in parallel to the axial direction X.

As described above, if structures are formed on the inner peripheral surface of the crankpin hole 35 in such a manner that the only beginning point of fracture is the inner peripheral surface of the crankpin hole 35, the big end 30 will be fracture-split into the rod portion 33 and the cap portion 34 at a single fractured surface F, whereby double fracturing is prevented. Therefore, any large projection is prevented from emerging on the fractured surface F, and loss of fractions from the fractured surface F is also prevented. As a result, a high roundness and cylindricality is obtained when the rod portion 33 and the cap portion 34 are assembled, and the occurrence of defective products is also reduced.

Note that the structures to be formed on the inner peripheral surface of the crankpin hole 35 are not limited to those illustrated herein.

In a big end 30 shown in FIG. 37, a pair of bearing seizure grooves 51 are formed on both sides of a fracture beginning trench 50 which is formed in the central portion of the inner peripheral surface of the crankpin hole 35. Chamfered portions 53 are formed at edges of the crankpin hole 35. On farther sides of the respective bearing seizure grooves 51, there are no fracture beginning trenches 50 or notches 52 formed; instead, a flat surface extends.

Since the stress concentration factor of the flat surface is smaller than the stress concentration factor of the fracture beginning trenches 50, stress concentration at the opposite ends of the inner peripheral surface of the crankpin hole 35 is alleviated. Since the chamfered portions 53 are formed at edges of the crankpin hole 35, stress concentration at the edges of the crankpin hole 35 is alleviated. As a result, stress will concentrate in the central portion of the inner peripheral surface of the crankpin hole 35.

Therefore, there is only one beginning point of fracture, that is, the central portion of the inner peripheral surface of the crankpin hole 35. As a result, as shown by arrows in FIG. 37, fracture progresses from only one point, i.e., the central portion of the inner peripheral surface of the crankpin hole 35.

In this case, a fractured surface is formed via fracture from the central portion of the inner peripheral surface of the crankpin hole 35. Therefore, the big end 30 is fracture-split into the rod portion 33 and the cap portion 34 at this single fractured surface, so that double fracturing does not occur.

In a big end 30 shown in FIG. 38, a notch 52 is formed in the central portion of the inner peripheral surface of the crankpin hole 35. A pair of bearing seizure grooves 51 are formed on both sides of the notch 52. A fracture beginning trench 50 is formed on the farther side of one of the bearing seizure grooves 51, whereas another notch 52 is formed on the farther side of the other bearing seizure groove 51. Furthermore, chamfered portions 53 are formed at edges of the crankpin hole 35.

In this case, within the inner peripheral surface of the crankpin hole 35, stress concentration is alleviated in the central portion (where the notch 52 is provided) and at the ends. Moreover, since the chamfered portions 53 are formed at edges of the crankpin hole 35, stress concentration at the edges of the crankpin hole 35 is also alleviated. As a result, stress will concentrate at the end of the inner peripheral surface of the crankpin hole 35 where the fracture beginning trench 50 is formed.

Therefore, there is only one beginning point of fracture, that is, one end of the inner peripheral surface of the crankpin hole 35. As a result, as shown by arrows in FIG. 38, fracture progresses from only one point, i.e., one end of the inner peripheral surface of the crankpin hole 35.

In this case, a fractured surface is formed via fracture from one end of the inner peripheral surface of the crankpin hole 35. Therefore, the big end 30 is fracture-split into the rod portion 33 and the cap portion 34 at this single fractured surface, so that double fracturing does not occur.

Figure 39:
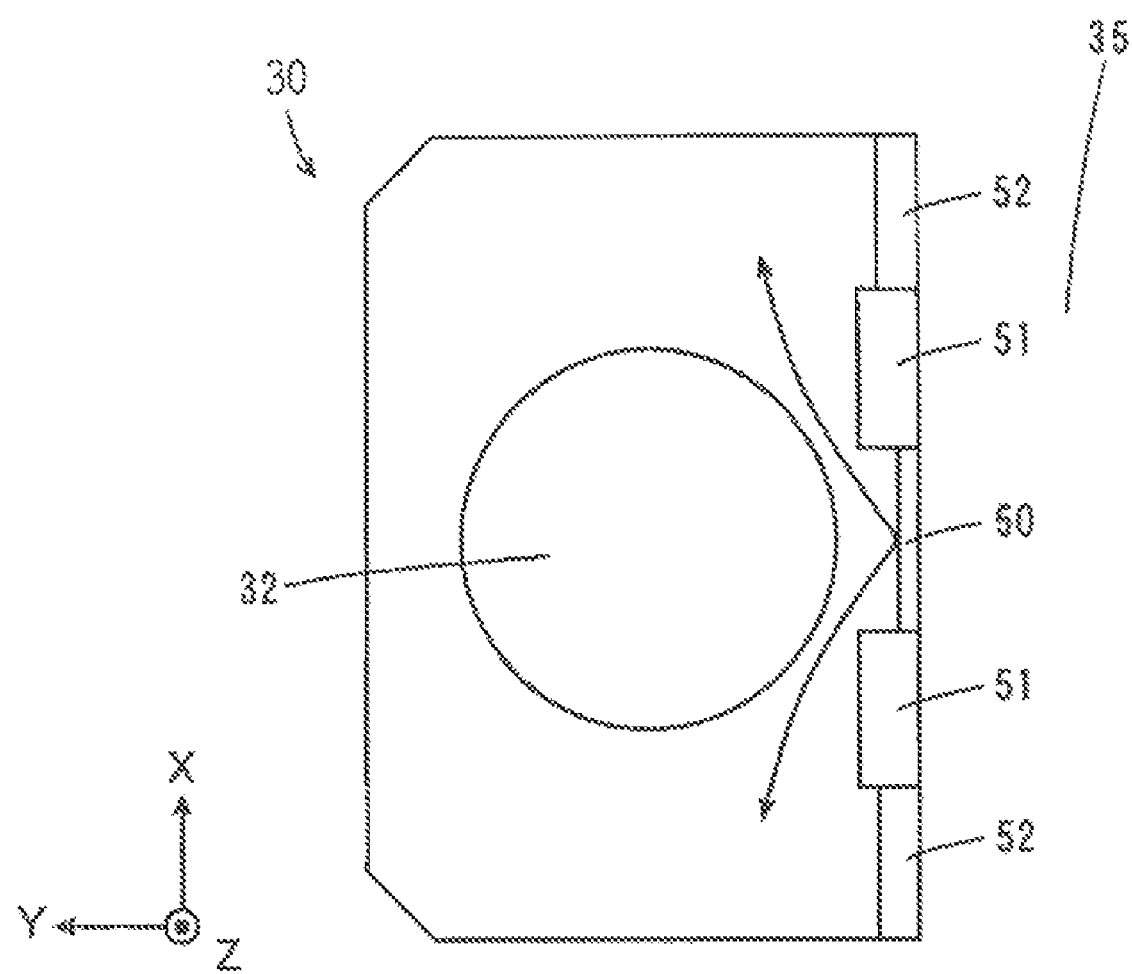
FIG. 39 is a schematic diagram showing a progress of a fracture on an intended fracture surface of a big end having another structure which is preferable for the prevention of double fracturing.

In a big end 30 shown in FIG. 39, a pair of bearing seizure grooves 51 are formed on both sides of a fracture beginning trench 50 which is formed in the central portion of the inner peripheral surface of the crankpin hole 35. Notches 52 are formed on farther sides of the respective bearing seizure grooves 51. No chamfered portions 53 are formed at edges of the crankpin hole 35.

Since the stress concentration factor of the notches 52 is smaller than the stress concentration factor of the fracture beginning trenches 50, stress concentration at opposite ends of the inner peripheral surface of the crankpin hole 35 is alleviated. As a result, stress will concentrate in the central portion of the inner peripheral surface of the crankpin hole 35.

Therefore, there is only one beginning point of fracture, that is, the central portion of the inner peripheral surface of the crankpin hole 35. As a result, as shown by arrows in FIG. 39, fracture progresses from only one point, i.e., the central portion of the inner peripheral surface of the crankpin hole 35.

In this case, a fractured surface is formed via fracture from the central portion of the inner peripheral surface of the crankpin hole 35. Therefore, the big end 30 is fracture-split into the rod portion 33 and the cap portion 34 at this single fractured surface, so that double fracturing does not occur.

Second Preferred Embodiment

Figure 40:
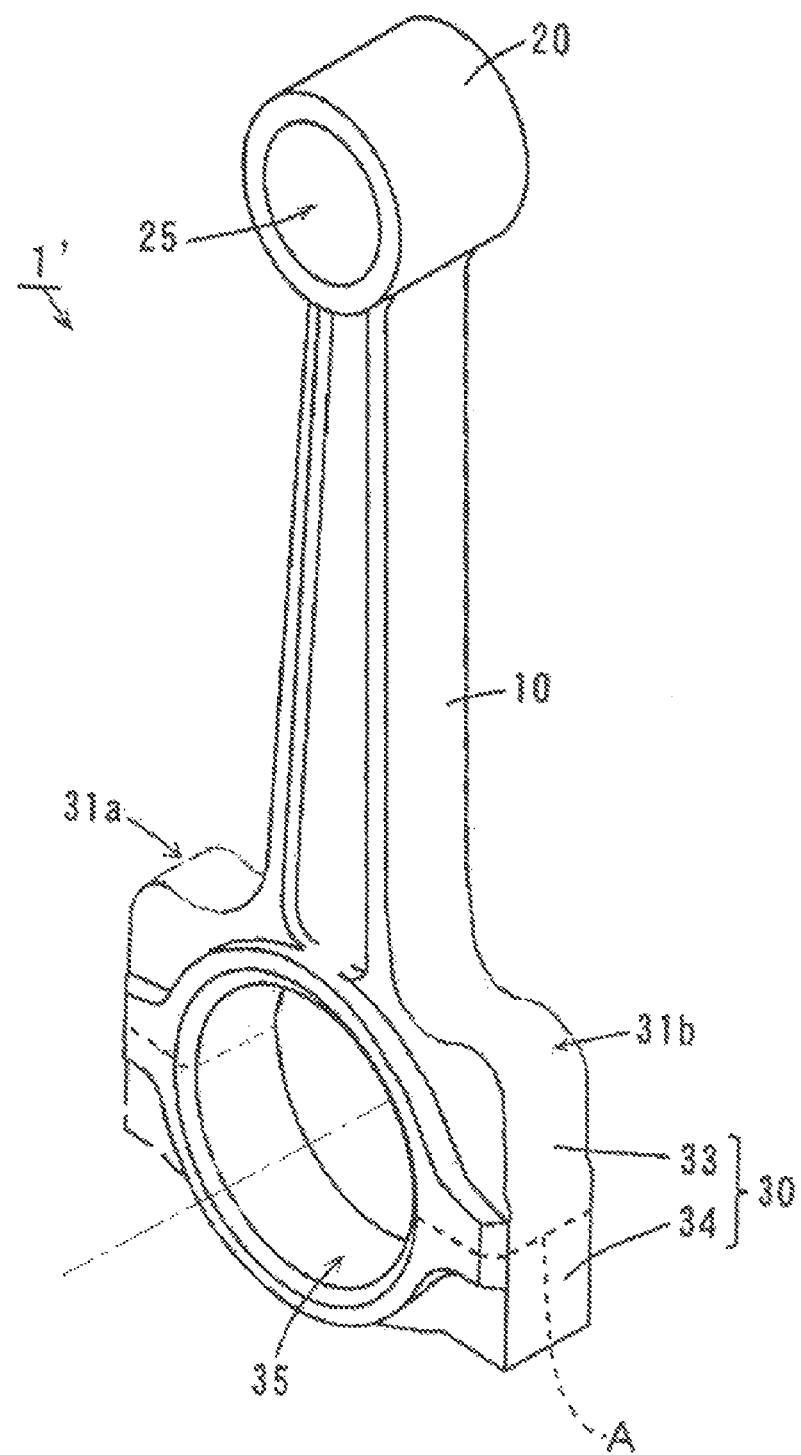
FIG. 40 is a perspective view which schematically shows a connecting rod according to a preferred embodiment of the present invention before undergoing a fracture split.

FIGS. 40 and 41 show a connecting rod 1' made of a titanium alloy according to the present preferred embodiment. FIGS. 40 and 41 are a perspective view and a plan view, respectively, which schematically show the connecting rod 1' before undergoing a fracture split.

As shown in FIGS. 40 and 41, the connecting rod 1' preferably includes a bar-like rod main body 10, a small end 20 which is provided at one end of the rod main body 10, and a big end 30 which is provided at the other end of the rod main body 10.

The small end 20 has a throughhole (piston pin hole) 25 for allowing a piston pin to extend therethrough. On the other hand, the big end 30 has a throughhole (crankpin hole) 35 for allowing a crankpin to extend therethrough. The crankpin hole 35 typically has a larger diameter than that of the piston pin hole 25.

Bolt holes 32 are formed in the big end 30 as shown in FIG. 41. The bolt holes 32 extend from the cap portion 34 toward the rod portion 33, and are each a bottomed hole having a bottom surface 32s inside the rod portion 33.

Moreover, the big end 30 has shoulders 31a and 31b extending from the rod main body 10 toward both lateral sides. In the present preferred embodiment, the shoulders 31a and 31b are preferably formed so as to be bulging. That is, the rod portion 33 of the big end 30 has protrusions 33a which protrude toward the small end 20. Stated otherwise, the inner sides of the shoulders 31a and 31b (i.e., the sides closer to the rod main body 10) are recessed.

In the big end 30 before undergoing a fracture split, as shown in FIGS. 40 and 41, the rod portion 33 and the cap portion 34 are integrally formed. The big end 30 is to be fracture-split along an intended fracture surface A, which is substantially parallel to the axial direction X and the width direction Y (i.e., substantially perpendicular to the longitudinal direction Z). The intended fracture surface A is prescribed so as to extend through the center axis of the crankpin hole 35, for example.

Figure 42:
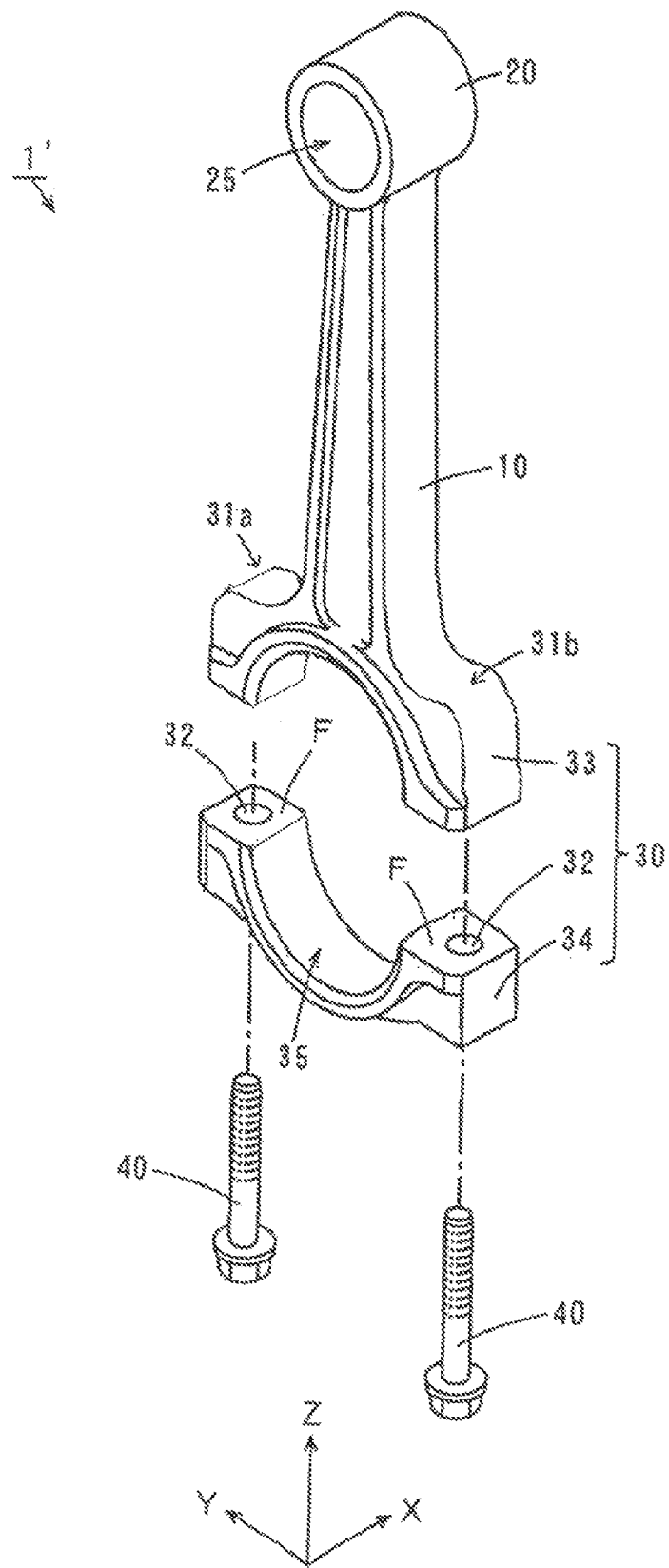
FIG. 42 is a perspective view which schematically shows a connecting rod according to a preferred embodiment of the present invention after undergoing a fracture split.

FIG. 42 shows the connecting rod 1' after undergoing a fracture split. The big end 30 of the connecting rod 1' has been split into the rod portion 33, which continues to the other end of the rod main body 10, and the cap portion 34, which is coupled to the rod portion 33 via connecting members (which herein are exemplified as bolts 40).

Through a fracture split, the rod portion 33 and the cap portion 34 each acquire a fractured surface F, on which minute rugged features are present. By allowing the fractured surface F of the rod portion 33 and the fractured surface F of the cap portion 34 to abut with each other, and screwing the bolts 40 into the bolt holes 32, the rod portion 33 and the cap portion 34 are coupled to each other.

Moreover, in the big end 30 of the connecting rod 1' according to the present preferred embodiment, as described above, bottomed holes preferably define the bolt holes 32, which extend from the cap portion 34 toward the rod portion 33 and each of which has a bottom surface 32s inside the rod portion 33. Therefore, the portion of each bolt hole 32 defining its bottom serves to reinforce the rod portion 33. As a result, the rigidity of the rod portion 33 can be enhanced as compared to the case where throughholes are formed as the bolt holes. Therefore, without making the rod portions 33 thick as shown in FIG. 49, sufficient rigidity can be ensured and deformation of the big end 30 can be prevented.

From the standpoint of ensuring a sufficiently high rigidity, it is preferable that the portion of each bolt hole 32 defining its bottom has more than a certain thickness. Specifically, the shortest distance from the bottom surface 32s of each bolt hole 32 to the outer surface of the rod portion 33 is preferably about 3 mm or more, and more preferably about 4 mm or more.

Figure 43:
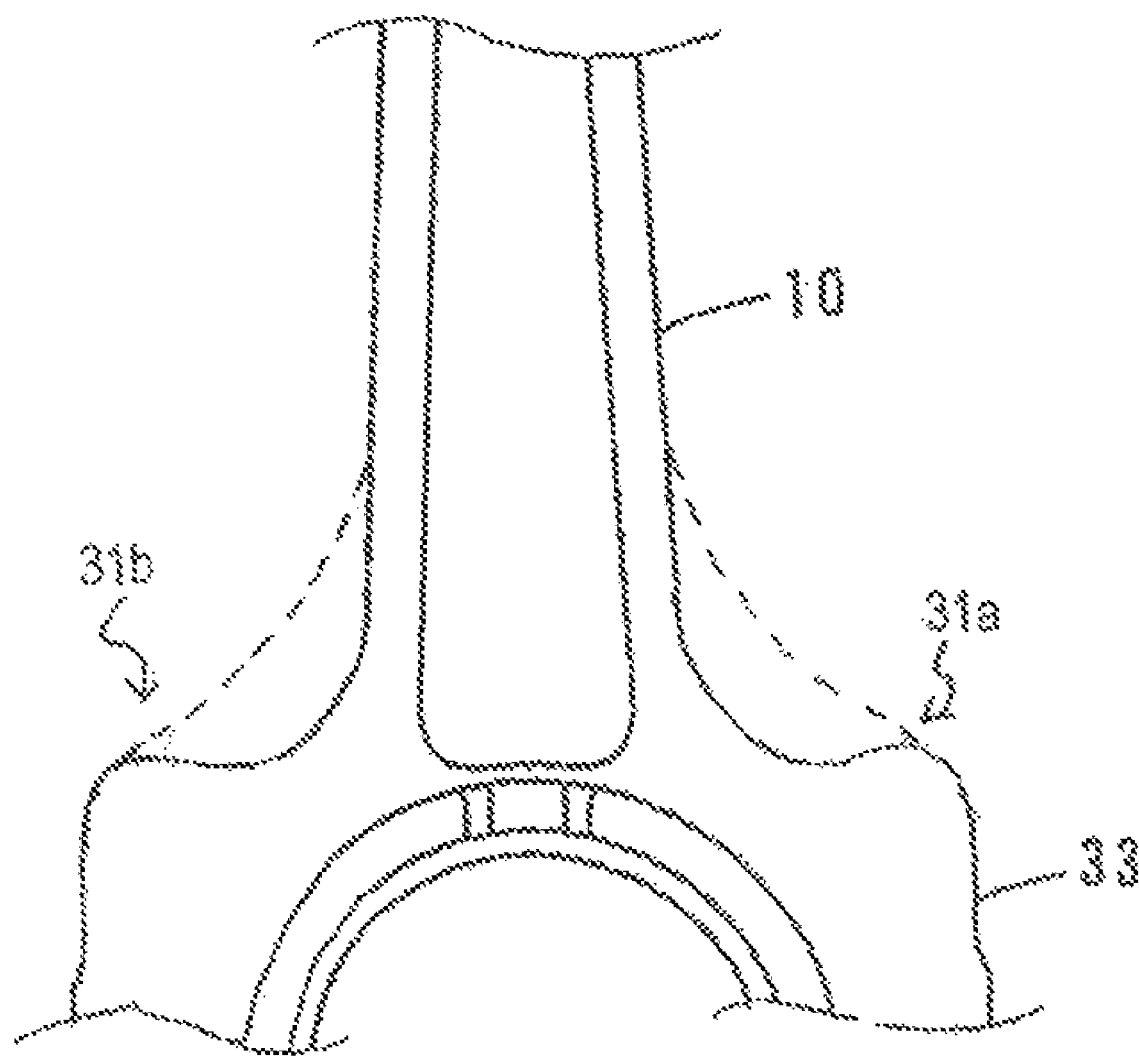
FIG. 43 is a diagram showing the area near shoulders of a connecting rod according to a preferred embodiment of the present invention.

In accordance with the connecting rod 1' of the present preferred embodiment, as described above, the rigidity of the rod portion 33 is enhanced because of the bolt holes 32 being bottomed holes. Therefore, sufficient rigidity can be ensured even by, as illustrated, designing the shoulders 31a and 31b so as to be bulging, i.e., so that the inner sides of the shoulders 31a and 31b (i.e., the sides closer to the rod main body 10) are recessed. The area around the shoulders 31a and 31b of the connecting rod 1' is shown enlarged in FIG. 43. For comparison, FIG. 43 also shows the shape of the connecting rod 501 shown in FIG. 49 (broken line), whose rod portion 533 is made thicker. As can be seen from FIG. 43, in the connecting rod 1' according to the present preferred embodiment, the shoulders 31a and 31b have more constricted contours than in the connecting rod 501 shown in FIG. 49, thus making for a reduced weight.

Although the fracture split-type connecting rod 1' is illustrated in the present preferred embodiment, it would also be possible, by adopting bottomed holes as the bolt holes, to ensure sufficient rigidity in any split-type connecting rod other than a fracture split-type.

Other Preferred Embodiments

Figure 44:
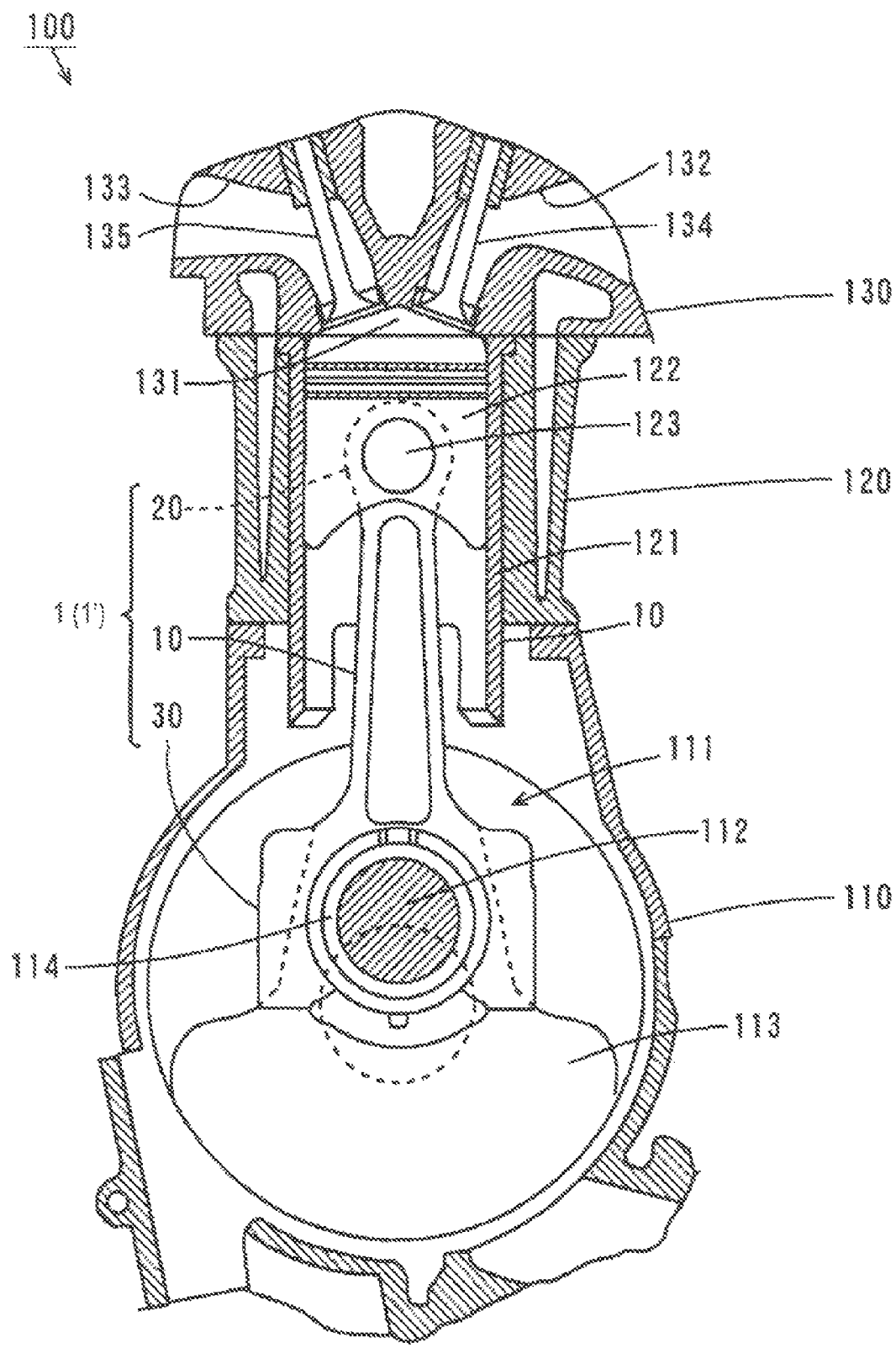
FIG. 44 is a cross-sectional view schematically showing an example of an engine which incorporates a connecting rod according to a preferred embodiment of the present invention.

The connecting rods 1 and 1' according to the above-described preferred embodiments can be broadly used in various types of internal combustion engines (engines) which are intended for automotive vehicles or other mechanical applications. FIG. 44 shows an example of an engine 100 which incorporates the connecting rod 1 of the first preferred embodiment (or the connecting rod 1' of the second preferred embodiment).

The engine 100 includes a crankcase 110, a cylinder block 120, and a cylinder head 130.

A crankshaft 111 is accommodated in the crankcase 110. The crankshaft 111 has a crankpin 112 and a crank web 113.

A cylinder block 120 is provided above the crankcase 110. A cylinder sleeve 121 having a substantially cylindrical shape is fitted within the cylinder block 120, such that a piston 122 is allowed to reciprocate inside the cylinder sleeve 121.

A cylinder head 130 is provided above the cylinder block 120. In conjunction with the piston 122 and the cylinder sleeve 121 in the cylinder block 120, the cylinder head 130 define a combustion chamber 131. The cylinder head 130 has an intake port 132 and an exhaust port 133. An intake valve 134 for supplying mixture to the interior of the combustion chamber 131 is provided within the intake port 132, and an exhaust valve 135 for enabling evacuation of the combustion chamber 131 is provided within the exhaust port 133.

The piston 122 and the crankshaft 111 are linked via the connecting rod 1 (1'). Specifically, a piston pin 123 of the piston 122 is inserted in the throughhole (piston pin hole) of the small end 10 of the connecting rod 1(1'), and the crankpin 112 of the crankshaft 111 is inserted in the throughhole (crankpin hole) of the big end 20, thus linking the piston 122 and the crankshaft 111 together. A bearing metal 114 is provided between the inner peripheral surface of the throughhole of the big end 20 and the crankpin 112. The bearing metal 114 is seized by the bearing seizure grooves 51.

Since the engine 100 shown in FIG. 44 incorporates the split-type connecting rod 1 of the first preferred embodiment (or the connecting rod 1' of the second preferred embodiment) made of a titanium alloy, weight reduction, high mileage, and high output can be realized.

Figure 45:
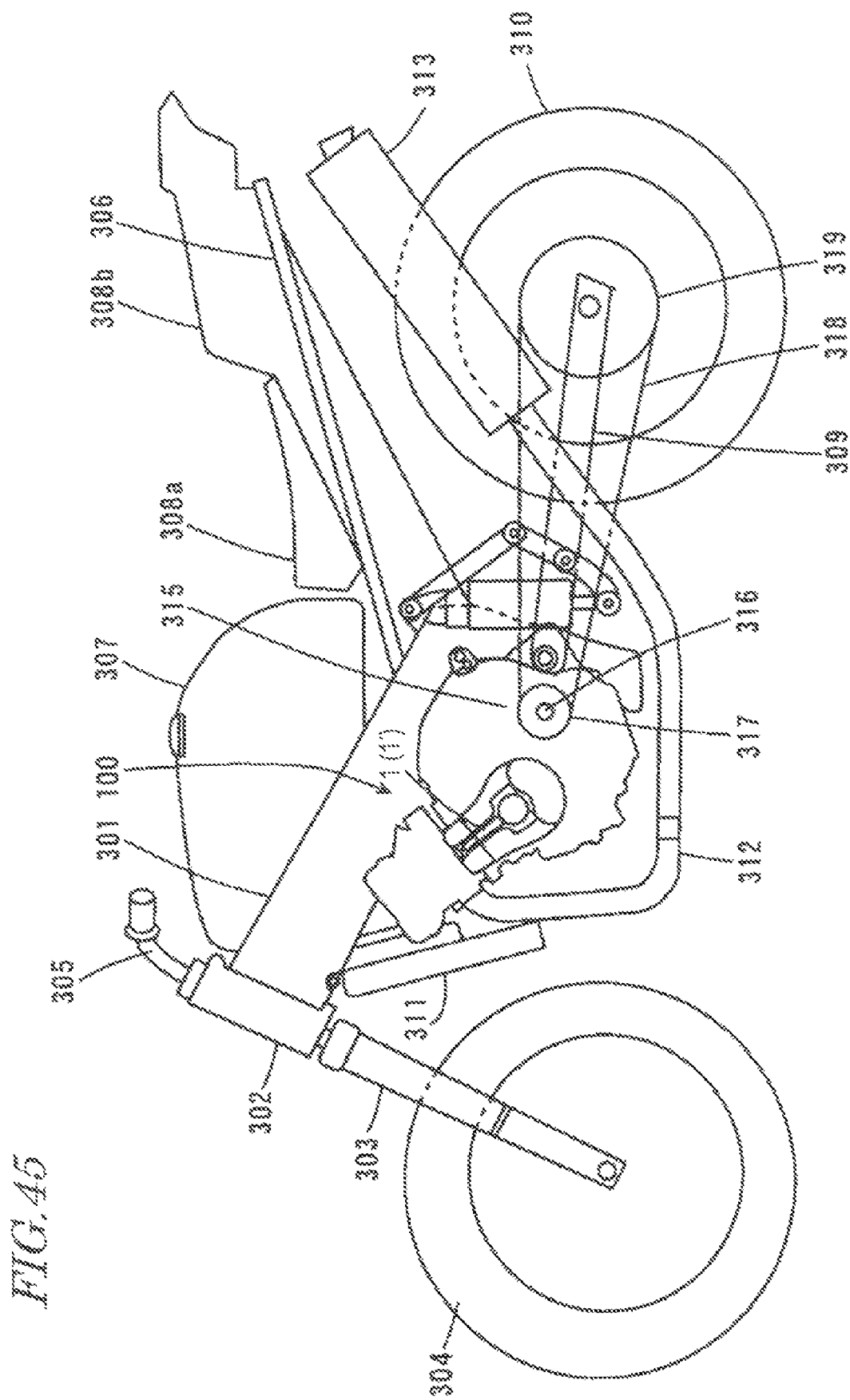
FIG. 45 is a cross-sectional view schematically showing a motorcycle which incorporates the engine shown in FIG. 44.
Figure 46:
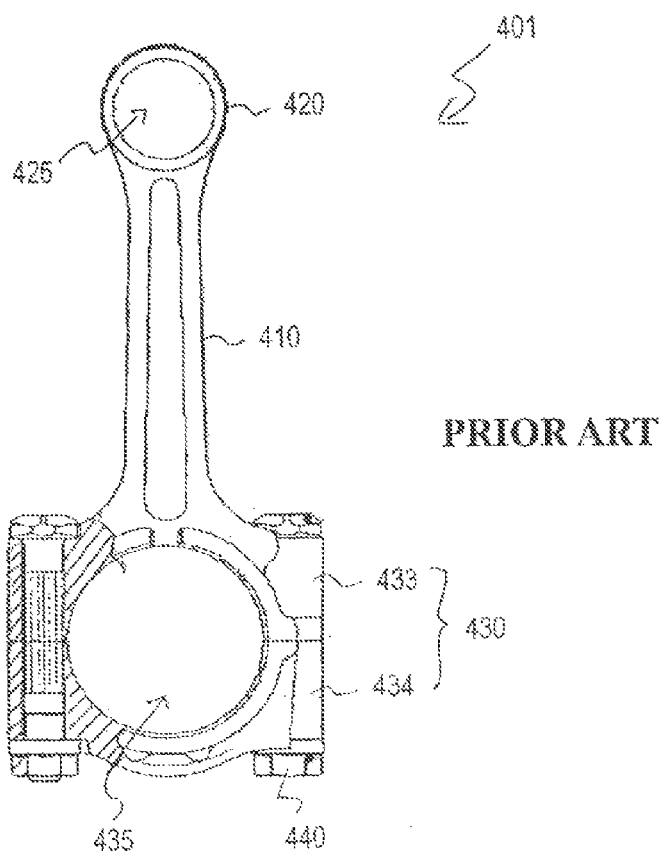
FIG. 46 is a front view schematically showing a conventional split-type connecting rod.
Figure 47:
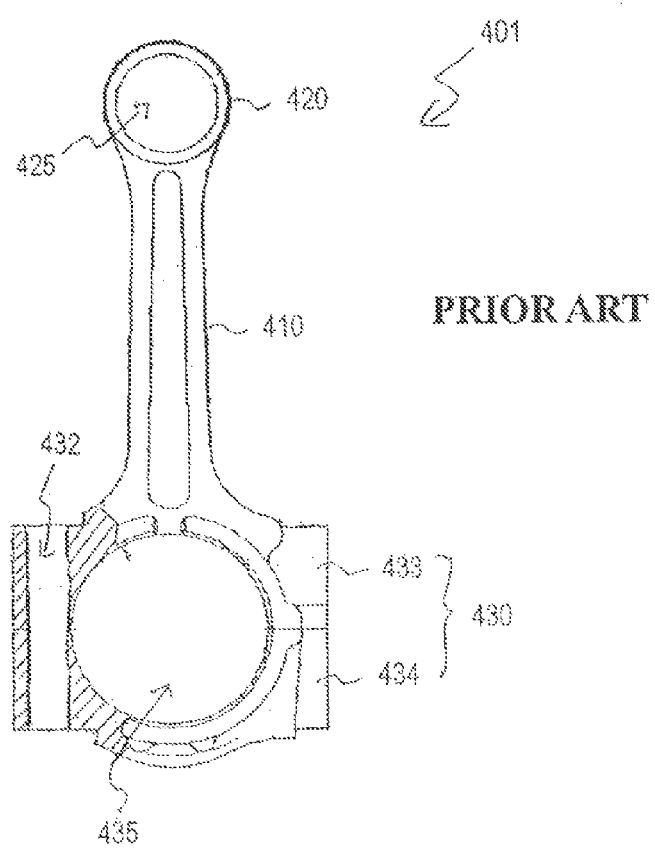
FIG. 47 is a front view schematically showing the split-type connecting rod of FIG. 46 without the bolts being engaged.

FIG. 45 shows a motorcycle which incorporates the engine 100 shown in FIG. 44.

In the motorcycle shown in FIG. 45, a head pipe 302 is provided at the front end of a body frame 301. To the head pipe 302, a front fork 303 is attached so as to be capable of swinging in the right-left direction of the vehicle. At the lower end of the front fork 303, a front wheel 304 is supported so as to be capable of rotating.

A seat rail 306 is attached at an upper portion of the rear end of the body frame 301 so as to extend in the rear direction. A fuel tank 307 is provided on the body frame 301, and a main seat 308a and a tandem seat 308b are provided on the seat rail 306.

Rear arms 309 extending in the rear direction are attached to the rear end of the body frame 301. At the rear end of the rear arms 309, a rear wheel 310 is supported so as to be capable of rotating.

At the central portion of the body frame 301, the engine 100 shown in FIG. 44 is held. The engine 100 incorporates the connecting rod 1 of the first preferred embodiment (or the connecting rod 1' of the second preferred embodiment). A radiator 311 is provided in front of the engine 100. An exhaust pipe 312 is connected to an exhaust port of the engine 100, and a muffler 313 is attached to the rear end of the exhaust pipe 312.

A transmission 315 is linked to the engine 100. Driving sprockets 317 are attached on an output axis 316 of the transmission 315. Via a chain 318, the driving sprockets 317 are linked to rear wheel sprockets 319 of the rear wheel 310. The transmission 315 and the chain 318 function as a transmitting mechanism for transmitting the motive power generated in the engine 100 to the driving wheel.

Since the motorcycle shown in FIG. 45 uses the engine 100, which incorporates the connecting rod 1 of the first preferred embodiment (or the connecting rod 1' of the second preferred embodiment), excellent performance can be obtained.

According to various preferred embodiments of the present invention, in a split-type connecting rod made of a titanium alloy, sufficient rigidity is ensured while suppressing unwanted increases in its weight.

A connecting rod made of a titanium alloy according to various preferred embodiments of the present invention can be broadly used in various types of internal combustion engines (e.g., an engine for an automotive vehicle).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2005-150953 filed on May 24, 2005, and No. 2005-148606 filed on May 20, 2005, the entire contents of which are hereby incorporated by reference.

What is claimed is:

1. A split connecting rod made of a titanium alloy, comprising:
   a rod main body; and
   a big end located at an end of the rod main body, the big end having a throughhole; wherein,
   the big end is fracture-split into a rod portion which continues from the end of the rod main body and a cap portion which is coupled to the rod portion;
   the rod portion and the cap portion each have a fractured surface on which rugged features are present;
   a difference in height between a highest portion and a lowest portion on each fractured surface is about 230 μm or more;
   each of the rod portion and the cap portion has inclusions in an area around the fractured surface thereof; and
   a longitudinal direction of the inclusions is at an angle of no less than 0° and no more than about 30° with respect to an abutting surface between the rod portion and the cap portion.

2. The connecting rod of claim 1, wherein the titanium alloy includes a rare-earth element and sulfur, and the inclusions are a compound of the rare-earth element and sulfur.

3. The connecting rod of claim 2, wherein the titanium alloy includes no less than about 0.05 wt % and no more than about 0.7 wt % of the rare-earth element and no less than about 0.05 wt % and no more than about 0.2 wt % of sulfur.

4. The connecting rod of claim 1, wherein the longitudinal direction of the inclusions is substantially parallel to the abutting surface.

5. The connecting rod of claim 1, wherein metal flow lines in an area around the abutting surface are substantially parallel to the longitudinal direction of the inclusions.

6. The connecting rod of claim 1, wherein the big end has a bolt hole in which a bolt for coupling together the rod portion and the cap portion is to be screwed, and
   the bolt hole is a bottomed hole which extends from the cap portion toward the rod portion and has a bottom surface within the rod portion.

7. The connecting rod of claim 6, wherein a shortest distance from the bottom surface of the bolt hole to an outer surface of the rod portion is about 3 mm or more.

8. The connecting rod of claim 6, wherein the rod portion of the big end includes a protrusion which protrudes toward the small end.

9. An internal combustion engine comprising the connecting rod of claim 1.

10. An automotive vehicle comprising the internal combustion engine of claim 9.

* * * * *